(12) United States Patent
Ananian

(10) Patent No.: US 8,682,683 B2
(45) Date of Patent: Mar. 25, 2014

(54) PRE-SCREENING SYSTEM AND METHOD

(75) Inventor: John Allen Ananian, Winchester, CA (US)

(73) Assignee: Prescreen Network, LLC, Mission Viejo, CA (US)

( * ) Notice: Subject to any disclaimer, the term of this patent is extended or adjusted under 35 U.S.C. 154(b) by 151 days.

(21) Appl. No.: 13/316,299

(22) Filed: Dec. 9, 2011

(65) Prior Publication Data

US 2012/0150761 A1    Jun. 14, 2012

Related U.S. Application Data

(60) Provisional application No. 61/422,077, filed on Dec. 10, 2010.

(51) Int. Cl.
| | |
|---|---|
| *G06Q 30/02* | (2012.01) |
| *G06Q 10/10* | (2012.01) |
| *G06Q 10/06* | (2012.01) |
| *G06Q 30/06* | (2012.01) |
| *G06Q 10/08* | (2012.01) |

(52) U.S. Cl.
USPC .............................. 705/1.1; 705/320; 705/321

(58) Field of Classification Search
USPC .................................................. 705/1.1–912
See application file for complete search history.

(56) References Cited

U.S. PATENT DOCUMENTS

| | | | |
|---|---|---|---|
| 6,618,734 | B1* | 9/2003 | Williams et al. ....................... 1/1 |
| 2002/0143573 | A1* | 10/2002 | Bryce et al. ........................ 705/1 |
| 2011/0208665 | A1* | 8/2011 | Hirsch et al. ................... 705/321 |

OTHER PUBLICATIONS

"Intuit Help Me Hire Beta," Intuit Inc., http://helpmehire.intuit.com, Accessed Dec. 24, 2011, 24 pages.

* cited by examiner

*Primary Examiner* — Jonathan Ouellette
(74) *Attorney, Agent, or Firm* — Alleman Hall McCoy Russell & Tuttle LLP

(57) ABSTRACT

An independent pre-screening system is provided. The independent pre-screening system may include a pre-screening workflow manager executed on one or more servers configured to receive a pre-screened candidate portfolio for an associated job posting. Each pre-screened candidate portfolio will receive a GPA based on predetermined set of fulfillment criteria. The system is configured to facilitate the execution of an automated pre-screening interview, and upon completion send the corresponding candidate portfolio to a candidate queue. The independent pre-screening system may further include a pre-screening candidate manager executed on the one or more servers configured to send a portion of the pre-screened candidate portfolio and a pre-screening rubric from the candidate queue to an online dashboard or remotely executed program, receive a portfolio evaluation from the pre-screening program, and rank the portfolio evaluation by GPA in a candidate status chart for the job posting.

24 Claims, 33 Drawing Sheets

```
Prescreen
Network
                                    Welcome, John Doe. (Not John?)
  Home    Sign In Sign In What is your email address?

Do you have a password? [        ]
   ○ No, I am new.
   ○ Yes, my password is: [        ]

Forgot your password? Click here.          ( CONTINUE )
```

```
Prescreen
Network
                                    Welcome, John Doe. (Not John?)
  Home    Sign In Setup Account
  Full Name       [        ] [  ] [        ]
  Phone           [        ]
  Email           [        ]    [        ]
  Password        [        ]    [        ]
  Support PIN     [        ]   Occupational Job Title [        ]
  PayPal Email    [        ]                      SSN [        ]
  Address
  Street Address  [        ]
  Address Line 2  [        ]
  City / Town     [        ]
  State / Province [       ]
  Postal Code     [        ]
  Country         [        ]                      ( SAVE )
```

Pre-screen Network Simulator
Job Pre-screening Dashboard

Please complete each simulator in the allotted time frame.

Upon completing all the simulators, you will be
notified of your score and status.

| Candidate A Simulator | Candidate B Simulator | Candidate C Simulator |
|---|---|---|
| Pass Score: 80% | Pass Score: 90% | Fail Score: 60% |
| Candidate D Simulator | Candidate E Simulator | Candidate F Simulator |
| Not Completed Score: | Not Completed Score: | Not Completed Score: |

| | | | |
|---|---|---|---|
| | RESUME EVALUATION   |   TELEPHONE CALL EVALUATION | | |
| Content Information | POOR<br>Resume is missing information and/or has less than required categories. | FAIR<br>Resume is missing some information but contains most essential categories. | GOOD<br>Resume contains all 5 categories:<br>- Employment History<br>- Basic Skills<br>- Education<br>- Achievements<br>- Hobbies |
| Attractiveness | POOR<br>Candidate's resume lacks substance and is inconsistent. | FAIR<br>Candidate's resume shows some progress but lacks some detail. | GOOD<br>Candidate's resume is impressive. |
| Content Information | POOR<br>More Than Four (4) errors are evident. | FAIR<br>No more than two (2) errors are evident. | GOOD<br>Preferred Answer:<br>No errors are evident. |

Report to Admin  |  Unable to Finish

← 902

| Posting | Eligibility | Resume | Phone Call | Finish |

Senior Software Engineer in San Diego, CA

Pay Amount:

Offered By:    Looking For:    Type of Work/Duration:

Vacation Days:

Job Title:    Industry:    Hours:

Health Insurance:

Job Description:      Responding to Location:

Overtime:

Job Starts:    Last Day to Apply:

Travel:

Target Language:

| | | | |
|---|---|---|---|
| Content Information | POOR<br>Resume is missing information and/or has less than required categories. | FAIR<br>Resume is missing some information but contains most essential categories. | GOOD<br>Resume contains all 5 categories:<br>- Employment History<br>- Basic Skills<br>- Education<br>- Achievements<br>- Hobbies |
| Attractiveness | POOR<br>Candidate's resume lacks substance and is inconsistent. | FAIR<br>Candidate's resume shows some progress but lacks some detial. | GOOD<br>Candidate's resume is impressive. |
| Spelling / Grammer | POOR<br>More Than Four (4) errors are evident. | FAIR<br>No more than two (2) errors are evident. | GOOD<br>Preferred Answer:<br>No errors are evident. |

RESUME EVALUATION  |  TELEPHONE CALL EVALUATION

Report to Admin  |  Unable to Finish          ←1002

| Offer | Eligibility | Resume | Phone Call | Finish |

Check Resume for Evidence of Eligibility
Candidate claims to have met the following requirements for this position
Experience & Skills

REQUIRED  [X]  10 years minimum – Industry experience
REQUIRED  [X]  5 years minimum – Software development
REQUIRED  [X]  2 years minimum – Experience with relational database design and programming
                       [X]  1 year minimum - Excellent written and verbal communication skills
                       [X]  6 months minimum – Startup Experience

| | | | |
|---|---|---|---|
| Content Information | POOR<br>Resume is missing information and/or has less than required categories. | FAIR<br>Resume is missing some information but contains most essential categories. | GOOD<br>Resume contains all 5 categories:<br>- Employment History<br>- Basic Skills<br>- Education<br>- Achievements<br>- Hobbies |
| Attractiveness | POOR<br>Candidate's resume lacks substance and is inconsistent. | FAIR<br>Candidate's resume shows some progress but lacks some detial. | GOOD<br>Candidate's resume is impressive. |
| Spelling / Grammer | POOR<br>More Than Four (4) errors are evident. | FAIR<br>No more than two (2) errors are evident. | GOOD<br>Preferred Answer:<br>No errors are evident. |

Report to Admin | Unable to Finish

— 1102

| Offer | Eligibility | Resume | Phone Call | Finish |

Overview
Employment History

Organization:   ABC Inc.
From / To:      08/01/2009 to PRESENT
Title:          Software Engineer
Responsibilities: Work closely with product team to translate business requirements to technical deliverables.
                Temecula, CA
                OK TO CONTRACT

RESUME EVALUATION | TELEPHONE CALL EVALUATION

| | | | |
|---|---|---|---|
| RESUME EVALUATION | TELEPHONE CALL EVALUATION | | |
| QUESTION 1 "Employer question here..." | POOR: No answer, unable to focus, or incorrect answer. | FAIR: "They could say..." | GOOD: "They should say..." |
| QUESTION 2 "Employer question here..." | POOR: No answer, unable to focus, or incorrect answer. | FAIR: "They could say..." | GOOD: "They should say..." |
| QUESTION 3 "Employer question here..." | POOR: No answer, unable to focus, or incorrect answer. | FAIR: "They could say..." | GOOD: "They should say..." |
| TONE | POOR: Poor mood, attitude, or emotion conveyed. | FAIR: Monotone mood, attitude or emotion conveyed. | GOOD: Positive mood, attitude or emotion conveyed. |
| CLARITY | POOR: Hard to understand. | FAIR: Somewhat difficult to understand. | GOOD: Quality of being clearly heard and easily understood. |
| COHERENCY | POOR: Does not use standard rules of speech. | FAIR: Language is inconsistent at times. | GOOD: Language follows standard rules of speech. |

Report to Admin | Unable to Finish     ← 1202

| Offer | Eligibility | Resume | Phone Call | Finish |

Telephone Phone Call

▷ ☐  [============]  2:36 Sec

External player | Highest Quality

FIG. 13

| Prescreen Offer Code: 10-67-J121P | POOR: 1 pts | FAIR: 2 pts | GOOD: 3 pts |
|---|---|---|---|
| Question 1<br>25 % What would you do if a patient came in without an insurance card | POOR<br>No answer, unable to focus or incorrect answer. | FAIR<br>"They could say..." | GOOD<br>"They should say..." |
| Question 2<br>25 % How would you answer a call while talking with a patient? | POOR<br>No answer, unable to focus or incorrect answer. | FAIR<br>"They could say..." | GOOD<br>"They should say..." |
| Question 3<br>25 % How would you handle a patient that does not comply with the doctors wishes? | POOR<br>No answer, unable to focus or incorrect answer. | FAIR<br>"They could say..." | GOOD<br>"They should say..." |
| Tone<br>7 % | POOR<br>Poor mood, attitude, or emotion conveyed. | FAIR<br>Monotone mood, attitude, or emotion conveyed. | GOOD<br>Positive mood, attitude, or emotion conveyed. |
| Clarity<br>6 % | POOR<br>Hard to Understand. | FAIR<br>Somewhat difficult to understand. | GOOD<br>Quality of being clearly heard and easily understood. |
| Coherency<br>6 % | POOR<br>Does not use standard rules of speech. | FAIR<br>Language is inconsistent at times. | GOOD<br>Language sticks with the standard rules of speech. |
| Confidence<br>6 % | POOR<br>Conveys little understanding of subject matter. | FAIR<br>Has fair grasp of the subject matter. | GOOD<br>Knows the subject matter well. |

FIG. 14

RESUME RUBRIC — 1400

| Offer Code 10-67-J121P | POOR: 1 pts | FAIR: 2 pts | GOOD: 3 pts |
|---|---|---|---|
| Content Information 40 % | POOR<br>Resume is missing information and or has less than required categories. | FAIR<br>Resume is missing some information but contains most essential categories. | GOOD<br>Resume contains all 5 categories:<br>*Employment History<br>*Basic Skills<br>*Education<br>*Achievements<br>*Hobbies |
| Attractiveness 40 % | POOR<br>Candidate's resume lacks substance and is inconsistent. | FAIR<br>Candidate's resume shows progress, but lacks some detail. | GOOD<br>Candidate's resume is impressive. |
| Spelling/Grammar 20 % | POOR<br>More than 4 errors are evident. | FAIR<br>No more than 2 errors are evident. | GOOD<br>No errors are evident. |

FIG. 15

| FEEDBACK RUBRIC | | | |
|---|---|---|---|
| Offer Code 10-67-J121P | POOR: 1 pts | FAIR: 2 pts | GOOD: 3 pts |
| Pre-screener 50 % Do you agree with pre-screener's score of x %? | POOR No. The candidate should have been denied. | FAIR Yes. However, the candidate should have received a slightly lower score. | GOOD The candidate was scored accurately. |
| Appearance 10 % Was their attire and grooming appropriate? | POOR Candidate's attire and grooming were poor. | FAIR Candidate's attire and grooming were acceptable. | GOOD Candidate's attire and grooming were excellent. |
| Preparedness 10 % Did the candidate have everything that was required of them? | POOR The candidate came poorly prepared. | FAIR The candidate came partially prepared. | GOOD The candidate came well prepared. |
| Non-verbal Presentation 10 % Was the candidate presenting themselves professionally? | POOR The candidate's mannerisms were annoying and disruptive. | FAIR The candidate's mannerisms were distracting at times, but tolerable. | GOOD The candidate's mannerisms were professional. |
| Candidate's Answers 10 % Did the candidate answer questions completely and confidently? | POOR The candidate's answers were poor. | FAIR The candidate's answers were satisfactory at times. | GOOD The candidate's answers were good. |
| Likely to Hire? 10 % How confident are you that the candidate is right for the job? | POOR Not confident. | FAIR Somewhat confident. | GOOD Very confident. |

Offer Cloud

Welcome, John Doe. (Not John?)

Home  Feedback/Support  My Account  My Offers  Sign Out

Responses

Purchase List

Please click below to purchase the list of candidates for Offer Code: 10-67-J121

[Purchase Now]

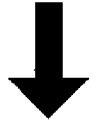

← 1602

OfferCloud

Welcome, John Doe. (Not John?)

Home  Feedback/Support  My Account  My Offers  Sign Out

Responses
Medical Assistant in San Diego, CA
To download a Candidate Offer Packet, click on the "Download" link.

[2.0 or higher ▽]

| Name | Submission Date | Prescreening Complete | GPA ▽ | Report |
|---|---|---|---|---|
| John Ananian | 12/08/2010 | 12/08/2010 06:40 AM | 2.49 | Download |

Records per page: [10 ▽]       Records 1 – 1 of 1 – Pages: ◁ 1 ▷

[Close]

FIG. 18

| Start/End Date | Offer | Company | Job Title |
|---|---|---|---|
| Jan 1 – Feb 1 | JN1-1 | ABC Inc. | Senior Developer |
| Jan 1 – Feb 1 | J1-1 | ABC Inc. | Senior Developer |
| Jan 1 – Feb 20 | R3-3 | ABC Inc. | Senior Developer |

Delete   Archive   Open

User ID
Password
Login

Archive
Download

OfferCloud  Welcome, John Doe. (Not John?)

Home   Benefits   My Account   My Offers   Sign Out

Change Offer > Job Offer   To Create your offer, please complete the following. (Fill test data)

| Step 1. Description | Step 2. Requirements | Step 3. Prescreen Questions |

Description

Offered By: ACME Inc.
Looking For: Recruiting Agency ▽
Industry: Software Services
Job Title: Senior Software Engineer
Job Description: We are looking for a senior engineer with a passion for architecting and building internet-based services on a massive scale.
Job Start Date: [  ]  [x] Immediate Opening
Application Cutoff: 11/21/2010

Location

Reporting to Location: Overseas ▽
Street Address: 123 1st Street
Address Line 2:
City/Town: Sand Diego
State/Province: CA
Postal Code: 92111
Country: United States
Target Language: French ▽
Pay Amount: Salary ▽  80000 to [  ] USD ▽
Hours: AM ▽
Employment: Training ▽
Duration: Less than 1 year ▽
Vacation Days: Unpaid ▽
Health Insurance: After probation period ▽
Overtime: No ▽
Travel: Domestic & International ▽

Resources

Will be able to upload documents, pictures, etc, describing the position.

[ Next ]

FIG. 22 ←2200

| OfferCloud | Welcome, John Doe. (Not John?) |

Home  Benefits  My Account  My Offers  Sign Out

Change Offer > Job Offer    Please enter the requirements for this position below.

| Step 1. Description | Step 2. Requirements | Step 3. Prescreen Questions |

Experience & Skills

| industry experience | 10 years minimum ▽ | [x] Require [ ] Prove [ ] Comment x Remove |
| software development | 5 years minimum ▽ | [x] Require [ ] Prove [ ] Comment x Remove |
| Strong people manage | 1 years minimum ▽ | [ ] Require [ ] Prove [x] Comment x Remove |

Proven ability to hire and grow high performing engineering teams.

| Experience with relation | 2 years minimum ▽ | [x] Require [ ] Prove [ ] Comment x Remove |
| Experience designing a | 6 years minimum ▽ | [ ] Require [ ] Prove [ ] Comment x Remove |
| Excellent written and ve | 1 years minimum ▽ | [ ] Require [ ] Prove [x] Comment x Remove |

Track record of working effectively with engineering and other functions.

| Startup Experience | 6 years minimum ▽ | [ ] Require [ ] Prove [x] Comment x Remove |

Working in a fast pace startup environment, with a hands-on, proactive attitude.

[ Add ]

Education

| College ▽ | | [x] Require [ ] Prove [x] Comment x Remove |

Bachelor's degree in Computer Science or equivalent experience.

[ Add ]

Certificates & Licenses

| Birth Certificate ▽ | | [x] Require [x] Prove [ ] Comment x Remove |

[ Add ]

Verification

| Business Insurance ▽ | | [x] Require [x] Prove [ ] Comment x Remove |

[ Add ]

Military Service

[ Add ]

Testing

| Logic Test ▽ | | [x] Require [ ] Prove [ ] Comment x Remove |

[ Add ]

Background Checks

| Personal References ▽ | 1-3 References ▽ | [x] Require [ ] Prove [ ] Comment x Remove |
| Professional References ▽ | 1-3 References ▽ | [x] Require [ ] Prove [ ] Comment x Remove |

[ Add ]        [ Next ]

| OfferCloud | Welcome, John Doe. (Not John?) |

Home   Benefits   My Account   My Offers   Sign Out

Change offer > Job offer        To complete your offer, please complete the following.

| Step 1. Description | Step 2. Requirements | Step 3. Prescreen Questions |

Question #1

Question for Candidate: Where do you like business logic – in the app or in the database? Why?

Preferred Good Answer: I want to hear "stored procedures" because they're easier for DBAs to test, tune and tweak.

Preferred Fair Answer: If somebody's been doing database administration long enough to claim the title Senior DBA

Question #2

Question for Candidate: How can you tell if a query will scale for production?

Preferred Good Answer: I want to hear that they do things like "load tests" or maybe look at "execution plans".

Preferred Fair Answer: If somebody's been doing database administration long enough to claim the title Senior DBA

Question #3

Question for Candidate: What third party database tools are your favorites?

Preferred Good Answer: If somebody's been doing database administration long enough to claim the title Senior DBA, they've built up a little wish list of database management tools they've seen along the way e.g. Data modeling, Change management, Backup compression, Performance monitoring, and Alerting.

Preferred Fair Answer: If somebody's been doing database administration long enough to claim the title Senior DBA Finish

OfferCloud          Welcome, John Doe. (Not John?)

Home | Feedback/Support | My Account | My Offers | Sign Out

My Offers
Found offers

| Offer Code | Offered By | Job Title | Location | Start Date | Days Left | Status |
|---|---|---|---|---|---|---|
| J3-1 | ACME Inc. | Medical Assistant | San Diego | December 11, 2010 | 2 | Under Review |

Under Review

Your application is being reviewed by the employer. The employer may ask you to complete additional assessments.

[ Withdraw ]

View receipt

Current Standing

You have a 2.5 GPA.

Congratulations! At this point in time, you are in the top 10% for this offer.

Created offers

| Offer Code | Offered By | Job Title | Location | Start Date | Days Left | Status |
|---|---|---|---|---|---|---|
| No offers | | | | | | |

[ Change Offer ]

---

OfferCloud          Welcome, John Doe. (Not John?)

Home | Feedback/Support | My Account | My Offers | Sign Out

My Offers
Found offers

| Offer Code | Offered By | Job Title | Location | Start Date | Days Left | Status |
|---|---|---|---|---|---|---|
| No offers | | | | | | |

Created offers

| Offer Code | Offered By | Job Title | Location | Start Date | Days Left | Status |
|---|---|---|---|---|---|---|
| J3-1 | ACME Inc. | Medical Assistant | San Diego | December 11, 2010 | 2 | Under Review |

Open Offer

This offer has been published, and is ready to be shared. Get the word out by posting on websites, mention in print materials, or the radio.

Click to share: J3-1

[ Change Info ] [ Pause Offer ] [ Remove Offer ]

Manage offer codes.
Change response templates.

Responses
3.0 or higher:    0
2.0 to 2.9:    0
Less than 2.0:    0
Resume only:    0

[ Get Responses ]

[ Change Offer ]

OfferCloud                                          Welcome, John Doe. (Not John?)
Home  Feedback/Support  My Account  My Offers  Sign Out Offer templates > For offer: Medical Assistant
Change your offer templates here. When finished, click "Save".

Response Letters

On Hold Letter:
Font [default ▽]  Size [default ▽]  [B] [I] [U]

[First Name],

Sorry,

The job you applied for has been placed on hold.

Sincerely,
[Your Name]

Off Removed Letter:
Font [default ▽]  Size [default ▽]  [B] [I] [U]

[First Name],

Sorry,

The job you applied for has been removed.

Sincerely,
[Your Name]

( Save )   ( Cancel )

Pre-screen Network

Home    Benefits    Join Today    Sign In

Enter Prescreen Offer Code

Search

Copyright 2010

OfferCloud.com

Home   Benefits   Join Today   Sign Out

Sign in

What is your email address?

My email address is:

Do you have a password?

○ No I am new.

○ Yes, my password is:

Continue

Forgot your password? Click here.

| OfferCloud | | | | Welcome, John Doe. (Not John?) |
|---|---|---|---|---|

Home  Benefits  My Account  My Offers  Sign Out

Requirements
Senior Software Engineer in San Diego, CA
Description

| Offered By: | Looking For: | Type of Work/Duration: | Pay Amount: |
|---|---|---|---|
| ACME Inc. | Recruiting Agency | Training/Less than 1 year | 80000 USD Salary |
| Job Title: | Industry: | Hours: | Vacation Days: |
| Senior Software Engineer | Software Services | AM | Unpaid |

Job Description:
We are looking for a senior engineer with a passion for architecting
and building internet-based services on a massive scale.

Health Insurance:
After probation period

Overtime:
No

Job Starts:
Immediately

Reporting to Location:
Overseas
123 1st Street
San Diego, CA 92111
United States Travel:
Domestic & International Last Day To Apply:
11/21/2010

Target Language:
French

Confirm Eligibility
Please check boxes indicating you meet eligibility for this position.

Experience & Skills
- REQUIRED ☐ 10 Years minimum – industry experience
- REQUIRED ☐ 5 Years minimum – software development
- REQUIRED ☐ 2 years minimum – Experience with relational database design and programming.
- ☐ 6 months minimum – Experience designing applications using cloud services like AWS a plus.
- ☐ 1 year minimum – Excellent written and verbal communication skills Track record of working effectively and other functions.

Education
- REQUIRED ☐ College
  Bachelor's degree in Computer Science or equivalent experience.

Certificates & Licenses
- REQUIRED ☐ Birth Certificate
  You will be asked to upload proof later.

Verification
- REQUIRED ☐ Business Insurance

Testing
- REQUIRED ☐ Logic Test

Background Checks
- REQUIRED ☐ Personal References – 1-3 References
- REQUIRED ☐ Professional References – 1-3 References Continue

OfferCloud      Welcome, John Doe. (Not John?)
Home   Benefits   My Account   My Offers   Sign Out Resume
Senior Software Engineer in San Diego, CA
Detail

Resume:    [ Choose File ]   No file chosen

Career Goals: [                    ]

Employment History

Organization: [                    ] x Remove

From/To: [        ] [        ] ☐ Currently Employed

Title: [                    ]

Responsibilities: [                    ]

Location: [        ] [        ]

Verification Contact: [      ] [      ] [      ]
☐ Do not contact me at this time

Education

School: [                    ] x Remove

From/To: [        ] [        ] ☐ Currently Attending

Area(s) of Study: [                    ]

Degree/Program: [              ] [ -Select- ▽ ] ☐ Graduated?

Location: [        ] [        ]

( Add )

Hobbies & Interests:

Hobby/Interest: [                    ] x Remove ( Add )

( Next )

| OfferCloud | Welcome, John Doe. (Not John?) |

Home  Benefits  My Account  My Offers  Sign Out

Prescreening
Senior Software Engineer in San Diego, CA

Instructions

What's Next
Instructions for your prescreening call

Video Player

Upon making your payment of $4.95 you will be shown three questions that the employer would like you to answer.

You will have five minutes to review the questions before receiving a call. Answer the phone and follow the directions.

If you do not answer or hang up prematurely, your interview will be canceled. You will receive a receipt and report card from your assigned pre-screener within 48 hours or less.

| Item | Quantity | Discount | Total |
|---|---|---|---|
| Prescreening & Assessment Report | 1 | -- | 3.95 USD |

Total charged:  Enter Coupon Code  3.95 USD

Select Payment: New credit card
Card Type / #: MasterCard  5555555554444  111  01  2017
Copy from my account
Name On Card: John Henry
Billing Address: 123 First Street
Address Line 2:
City/Town: Murrieta
State/Province: CA
Postal Code: 123456
Country: United States
Billing Phone: 1231231234    [x] Remember this card

Terms & Conditions

Terms of Use / Disclaimer

[x] I Agree To The Terms

Please read these terms carefully. By checking the "I AGREE" box above you acknowledge that you have read and understand this agreement and agree to be bound by its terms and conditions. If you do not agree to these terms please exit.

OfferCloud

Welcome, John Doe. (Not John?)

Home    Benefits    My Account    My Offers    Sign Out

Pre-screening Call

Senior Software Engineer in San Diego, CA

Enter your phone number below and click "Start Timer". You will be shown three questions that the employer would like you to answer. You will have five minutes to review the questions before receiving a call. Answer the phone and follow the directions. If you do not answer or hang up prematurely, your interview will be canceled.

REVIEW TIME 0 0 : 0 0

IMPORTANT: you must be able to answer your phone at the number you provide below when the timer is finished.

You have started the timer. Be sure to pick-up when 9512108982 rings.

Your Questions

1. Where do you like business logic – in the app or in the database? Why?

2. How can you tell if a query will scale for production?

3. What third party database tools are your favorites?

View Receipt

PRE-SCREENING SYSTEM AND METHOD

CROSS-REFERENCE TO RELATED APPLICATION

This application is based on and claims priority to U.S. Provisional Application Ser. No. 61/422,077, entitled PRE-SCREENING SYSTEM AND METHOD, filed Dec. 10, 2010, the entire disclosure of which is herein incorporated by reference.

BACKGROUND

Multiple personnel may be involved in the hiring process of an employee. Larger businesses, companies, etc., may have human resources (HR) departments that are responsible for managing staff as well as other employee related issues. Smaller businesses may subcontract the HR work to outside recruiting firms or may delegate the staffing responsibilities to higher level executives or managers. In either case, the hiring process may be costly and time consuming due to the relatively high wages paid to personnel with human resource training.

However, many staffing tasks do not require a high level of training to perform and can be carried out by less skilled personnel. For example, sorting through job applications to determine if the job applicants have the proper qualifications is a straightforward and repetitive task. It may be an inefficient use of a business' resources to have high level executives or skilled HR employees performing these types of tasks.

Attempts have been made to automate some of the staffing tasks to increase the efficiency of the hiring process and reduce costs. For example, algorithms have been developed to search resumes for predetermined keywords to determine if an applicant meets the required qualifications for a job. However, these types of algorithms cannot judge personal traits or characteristics. For example, a person's demeanor, personality, etc., cannot be ascertained via such an algorithm. When these types of algorithms are employed, a large percentage of the hiring tasks are still performed by HR personnel, managers, executives, etc., which can be expensive and time consuming.

SUMMARY

An independent pre-screening system is provided. The independent pre-screening system may include a pre-screening workflow manager executed on one or more servers configured to receive a pre-screening candidate portfolio for an associated job posting, if the pre-screening candidate portfolio passes a predetermined set of fulfillment criteria then execute an automated pre-screening interview, and if the automated pre-screening interview has been completed then send the corresponding application portfolio to a candidate queue. The independent pre-screening system may further include a pre-screening candidate manager executed on one or more servers and configured to send a portion of the pre-screening candidate portfolio and a pre-screening rubric from the candidate queue to a remotely executed pre-screening program operated by remote personnel, receive a portfolio evaluation from the pre-screening program, and rank the portfolio evaluation in a candidate status chart for the job posting.

The independent pre-screening system allows the personal traits and characteristics of a large number of job applicants to be quickly and efficiently assessed by a network of personnel in distributed locations without requiring expensive in-house training. In this way, a low cost service may be provided to a large number of employers who do not have the resources or the time to carry out preliminary staffing tasks in house.

BRIEF DESCRIPTION OF THE FIGURES

FIGS. 5A and 5B show Graphical User Interfaces (GUIs) that enable a pre-screener to login to the pre-screening system.

FIG. 7 shows a GUI that may be presented via the independent pre-screening system after the pre-screening simulator is selected in the independent pre-screening system.

FIGS. 9-14 show a plurality of rubrics that may be used by the pre-screener to grade a candidate in the independent pre-screening system.

FIG. 15 shows a GUI displaying a feedback rubric for grading a pre-screener in the independent pre-screening system.

FIG. 16 shows a GUI which may be used by an employer to download a candidate offer packet in the independent pre-screening system.

FIG. 18 shows a GUI for displaying job postings in the independent pre-screening system.

FIG. 21 shows a GUI that may be used to create a job posting in the independent pre-screening system.

FIG. 22 and shows a GUI that may be used to create a job posting in the independent pre-screening system.

FIG. 23 shows a GUI that may be used to generate pre-screening questions for the candidates in the independent pre-screening system.

FIG. 25 shows a GUI that may be used to present a job posting dashboard in the independent pre-screening system.

FIG. 26 shows a GUI that may be used by an employer to customize notification letters sent to a candidate in the independent pre-screening system.

FIG. 27 shows a GUI that may be used to search for offers in the independent pre-screening system.

FIG. 28 shows a GUI that may be used as the login page for both pre-screening candidates and/or employers in the independent pre-screening system.

FIG. 29 shows a GUI that may be used by a pre-screening candidate to register for a job posting in the independent pre-screening system.

FIG. 30 shows another GUI that may be used by a pre-screening candidate to register for a job posting in the independent pre-screening system.

FIG. 31 shows a GUI configured to accept a payment from a pre-screening candidate in the independent pre-screening system.

FIG. 33 shows a GUI that may be used to present interview questions to a pre-screening candidate in the independent pre-screening system.

DETAILED DESCRIPTION

Figure 1:
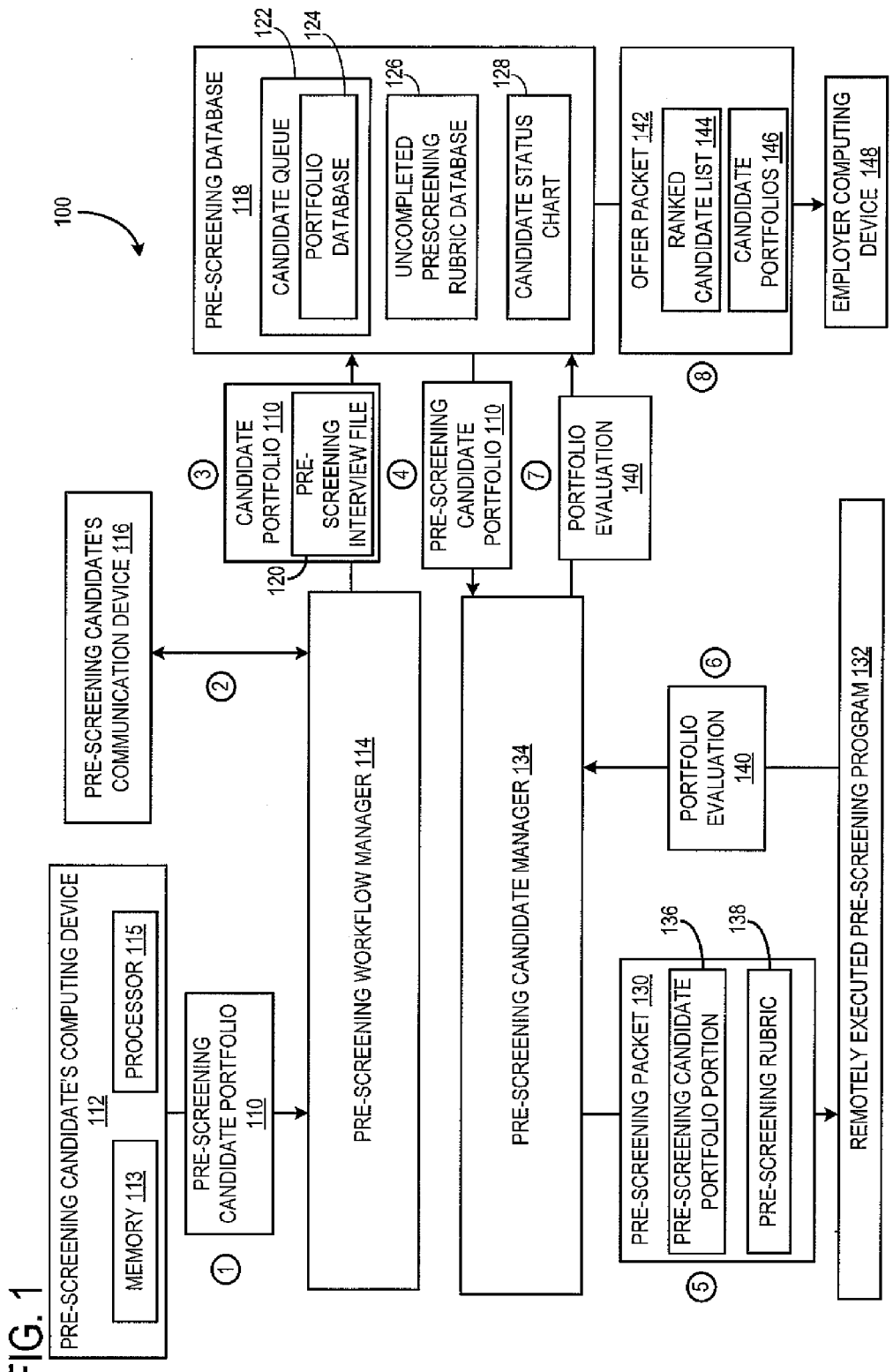
FIG. 1 shows a schematic depiction of an independent pre-screening system.

FIG. 1 shows a schematic depiction of an exemplary process flow in an independent pre-screening system 100 for managing and tracking job postings. As described herein, a job posting is an unfilled job position posted by an employer (e.g., business, company, etc.). Each general step in the depicted process flow is denoted by a circled numeral.

At step 1, a pre-screening candidate portfolio 110 is transferred from a pre-screening candidate's computing device 112 to a pre-screening workflow manager 114. Thus, the pre-screening candidate's computing device 112 sends the pre-screening candidate portfolio 110 to the pre-screening workflow manager 114 and the pre-screening workflow manager 114 receives the pre-screening candidate portfolio 110 from the pre-screening candidate's computing device 112.

The pre-screening candidate portfolio 110 may be associated with a job posting, in some examples. In other words, the candidate may initiate step 1 in response to viewing a job posting via the pre-screening system 100. The job posting may be generated via a prospective employer. It will be appreciated that the job posting may be marketed through printed publications, the Internet, television, and/or radio, for example. In the case of Internet advertising, a link on a webpage may provide a portal to the independent pre-screening system 100. Therefore, the independent pre-screenings system may be configured to enable the pre-screening candidate's computing device 112 to view the job posting or a plurality of job postings. For instance, the pre-screening candidate's computing device 112 may access a website, managed via the independent pre-screening system 100, displaying current job postings in the independent pre-screening system 100. It will be appreciated that the candidate may choose to repeat step 1 to update their candidate portfolio.

However in other examples, the pre-screening candidate portfolio 110 may be generally sent to the pre-screening workflow manager 114 for posting so that a number of prospective employers, some of whom may not have posted jobs, can view the pre-screening candidate portfolio 110. In such an example, the candidate may choose to associate the candidate's profile with a job category such as accounting, information technology, legal, medical, sales, engineering, etc. Thus, the candidate can self-initiate the pre-screening process and generally post the candidate's portfolio. In this way, a large number of employers can view the candidate's portfolio. As a result, the candidate can be seen more easily by prospective employers without responding to a specific job posting, thereby decreasing the time spent by the candidate searching for jobs. Further in some examples, the candidate may choose the period of time that their pre-screening candidate portfolio stays in the independent pre-screening system 100. For example, the candidate may choose that the pre-screening candidate portfolio stays valid for a specified period, such as a month, six months, or a year. However, in other examples the pre-screening candidate portfolio may be stored in the pre-screening system indefinitely or the validity period may be pre-determined by the independent pre-screening system 100. Therefore, in some embodiments the candidate may be requested to update their portfolio at a pre-determined time interval.

The pre-screening candidate portfolio 110 may include one or more files, such as the pre-screening candidate's resume, including career goals, employment history, education, hobbies, interests, etc., an offer compliance checklist, recorded audio interview, various kinds of documented proof concerning skills and abilities, training, achievements, various assessments, background checks, etc. It will be appreciated that the employer may determine the information that should be included in the pre-screening candidate portfolio 110, in some examples.

The pre-screening workflow manager 114 may be executed on one or more servers. The servers may include code stored in memory executable by a processor to implement the functionality of the pre-screening workflow manager 114 described herein. The pre-screening candidate's computing device 112 may also include code stored in memory 113 executable via a processor 115 to implement the functionality of the candidate's computing device 112 described herein. In some examples, a suitable network (e.g., the Internet, a virtual private network (VPN), a Local Area Network, etc.,) or combination of networks may enable communication between the pre-screening candidate's computing device 112 and the pre-screening workflow manager 114, the pre-screening candidate manager 134, remotely executed pre-screening program 132, and/or the employer computing device 148. Thus, the pre-screening candidate's computing device 112 and the pre-screening workflow manager 114, the pre-screening candidate manager 134, remotely executed pre-screening program 132, and/or the employer computing device 148 electronically communicate via wired and/or wireless communication paths. The pre-screening candidate manager 134, remotely executed pre-screening program 132, and the employer computing device 148 are discussed in greater detail herein with regard to steps 3-8.

At step 2, an automated pre-screening interview is executed via the pre-screening workflow manager 114 in response to receiving the pre-screening candidate portfolio. In some examples, the automated pre-screening interview is executed if the pre-screening candidate portfolio 110 passes a predetermined set of fulfillment criteria, the fulfillment criteria including at least one of a payment criterion and a fulfillment criterion including one or more of an offer requirement, resume, automated interview, and/or candidate fee, and a graded evaluation of the pre-screening candidate portfolio is made in part based on how many of the predetermined set of fulfillment criteria are fulfilled and the quality and nature of the manner in which they are fulfilled. The predetermined set of fulfillment criteria may be determined via the employer associated with the job posting. In this way, the employer enables the independent pre-screening system 100 to filter prospective candidates. However, in other examples the pre-screening candidate portfolio 110 may not be required to pass a set of fulfillment criteria. Further in some examples, the automated pre-screening interview may be executed in response to receiving an interview invitation from an employer computing device 148. Additionally, in some examples step 2 may be initiated if a payment has been received by the pre-screening system from at least one of the candidate, the employer, and a third party. In some embodiments, the candidate, employer, and/or third party may each provide a portion of the payment.

During execution of the automated pre-screening interview, the pre-screening workflow manager 114 may be configured to provide predetermined audio clips and/or text clips to a pre-screening candidate's communication device and collects responses to the audio and/or text clips for a predetermined time period. The predetermined audio and/or text clips may be predetermined questions and/or answers determined by an employer related to the job posting.

Collecting the responses to the audio clips and/or text clips may include receiving and/or recording responses to the audio clips and/or text clips for a predetermined time period. In one example, two-way audio communication may be established between the candidate's communication device 116 and the one or more servers when the audio clips are provided to the pre-screening candidate's communication device and the responses to the audio clips are recorded. However, in other examples recording the responses may include recording input from a keyboard or other peripheral device.

In some examples, the pre-screening candidate's communication device may be included in pre-screening candidate's computing device 112. However in other examples, the pre-screening candidate's communication device 116 may be a device, such as a telephone, that is external to the pre-screening candidate's computing device 112. In other examples, the pre-screening candidate's communication device and computing device may be integrated in a smart phone or a VOIP enabled personal computer, for example.

An interview file may be generated during execution of the pre-screening interview. The interview file may include the pre-screening candidate's answers in an audio file or a text file containing a transcription of the pre-screening candidate's answers. It will be appreciated that speech recognition software may be used to transcribe the pre-screening candidate's answers to text. The pre-screening interview is discussed in greater detail herein.

Additionally, the pre-screening workflow manager 114 may be configured to persistently track the pre-screening candidate portfolio for updates subsequent to execution of the automated pre-screening interview. Furthermore, the pre-screening workflow manager 114 may be configured to send an update message to a candidate's computing device 112 corresponding to the pre-screening candidate portfolio 110 when the pre-screening candidate portfolio has been updated.

If the pre-screening interview has been completed, the pre-screening candidate portfolio 110 is sent from the pre-screening workflow manager to a pre-screening database 118 at step 3. The pre-screening candidate portfolio may include the pre-screening interview file 120 generated in step 2. The pre-screening database may include a candidate queue 122 which may include a portfolio database 124 including a plurality of application portfolios. The pre-screening database may further include an uncompleted pre-screening rubric database 126 including a plurality of pre-screening rubrics, each pre-screening rubric associated with a different job posting. Additionally the pre-screening database may further include a candidate status chart 128, discussed in greater detail herein.

At step 4, the pre-screening candidate manager 134 requests and receives the pre-screening candidate portfolio from the candidate queue 122. The pre-screening candidate manager 134 may be executed on one or more servers. The one or more servers may be the same servers on which the pre-screening workflow manager is executed or alternatively the pre-screening candidate manager 134 may be executed on different servers.

At step 5 the pre-screening candidate manager 134 sends a pre-screening packet 130 to a remotely executed pre-screening program 132 (executed on a pre-screener computing device) from a pre-screening candidate manager 134. The pre-screening program is accessible by a pre-screener, i.e., a human operator trained to review the pre-screening packets of candidates. The pre-screening packet 130 includes a portion 136 of the pre-screening candidate portfolio 110 and at least one pre-screening rubric 138 to a remotely executed pre-screening program. The remotely executed pre-screening program may be executed on a computing device storing code executable via a processor such as a laptop computer, desktop computer, smartphone, gaming console, etc., thereby enabling the pre-screener to access the remotely executed pre-screening program from a multitude of devices. In some examples, the remotely executed pre-screening program may include an online dashboard displayable via a browser or "app". Therefore in such an example, the pre-screener can access the remotely executed pre-screening program from any device that is connected to the Internet.

Further in some examples, the pre-screening candidate's personal information (e.g., a name, address, telephone number, social security number, driver's license number, etc.) may be removed from the pre-screening candidate portfolio to protect the pre-screening candidate's privacy. Therefore, the portion of the candidate portfolio sent to the remotely executed pre-screening program may not include any personally identifiable information of the candidate, and the personally identifiable information may be maintained internally in the pre-screening candidate manager via storage of the personal identifiable information in the memory of the pre-screening candidate manager. The personal identifiable information that may be maintained internally in the pre-screening candidate manager may include least one of a name, an address, a telephone number, a social security number, and a pre-screening receipt for verification.

The pre-screening rubric 138 is a file that enables a pre-screener to evaluate a pre-screening candidate's resume and interview file. For example, various grading criteria may be provided within the pre-screening rubric 138 allowing a pre-screener to easily score the pre-screening candidate's interview file and resume. Furthermore, the pre-screening rubric 138 may be presented on a Graphical User Interface (GUI) generated by the remotely executed pre-screening program 132.

Exemplary pre-screening rubrics are shown in FIG. 9-14. In particular, FIGS. 9-11 and 14 show pre-screening resume rubrics for evaluating a candidate's resume. Various assessment criteria and grades for each assessment criteria are provided in the pre-screening rubric. Specifically, the grading criteria provided in the pre-screening resume rubric portion shown in FIGS. 9-11 and 14 include content information, attractiveness, and spelling/grammar. Furthermore, FIGS. 12 and 13 show a number of interview rubric sections for grading the pre-screening candidate's interview. Various assessment criteria are provided for each question including the preferred response for each question. The interview rubric sections may have a weight with each question interview, such as the various percentages (25%, 25%, etc.) for each question and factor indicated in the leftmost column of FIGS. 13 and 14. These weights may be assigned by an office manager or other authorized person. A value is associated with each possible grade, such as 1 point for POOR, 2 points for FAIR, and 3 points for GOOD as illustrated in FIGS. 13 and 14. The total weighted average of the scores earned for each of the questions determines the overall pre-screening interview grade point average (GPA). However, other methods may be used to score the portion of the candidate's portfolio in other examples. The independent pre-screening system 100 may analyze rubric scores for pass-through, coaching, and pre-screener compliance. It will be appreciated that the rubric sections in FIGS. 9-14 are exemplary in nature and rubrics using a different layout, grading criteria, scoring, etc., may be utilized in other embodiments.

Among other things the pre-screening candidate manager may be configured to manage pre-screening for a plurality of pre-screeners. It will be appreciated that a pre-screener may be a person contracted by the workflow management system to evaluate pre-screening candidate portfolios. The hiring and evaluation of the pre-screeners is discussed in greater detail herein. Once the pre-screener has received the prescreening packet 130 via the remotely executed pre-screening program 132 the pre-screener may grade the portion 136 of pre-screening candidate portfolio 110 via the pre-screening rubric 138. It will be appreciated that the pre-screener may grade the candidate's resume as well as the interview file through the pre-screening rubric 138.

Therefore, pre-screener may generate a portfolio evaluation via the remotely executed pre-screening program 132 from the pre-screening rubric 138, the evaluation assessing the portion 136 of the pre-screening candidate portfolio 110. In particular, the portfolio evaluation may include grading data for the pre-screening candidate's resume and the interview file generated by the pre-screener. Furthermore, the portfolio evaluation is configured to receive pre-screener input via a computing device.

At step 6, a portfolio evaluation 140 is sent to the pre-screening candidate manager 134 from the remotely executed pre-screening program 132 and the pre-screening candidate manager 134 receives the portfolio evaluation from the remotely executed pre-screening program 132. It will be appreciated that steps 1-6 may be repeated for a plurality of pre-screening candidates, thereby generating a plurality of pre-screening candidate portfolios and portfolio evaluations. In some examples, the portfolio evaluation 140 may also be sent to the pre-screening candidate's computing device 112, enabling the candidate to view the portfolio evaluation. If the portfolio evaluation does not satisfy the pre-screening candidate, the candidate may request that their candidate portfolio and/or portfolio evaluation be removed from the pre-screening system. Furthermore coaching information, such as tips on how to improve their portfolio evaluation score, may be provided to the candidate if they choose to remove the portfolio from the pre-screening system.

At step 7, the portfolio evaluation 140 is ranked via the pre-screening candidate manager in a candidate status chart 128. In some examples, the candidate status chart 128 corresponds to a job posting. However, in other examples, the candidate status chart may not correspond to a job posting. Thus, an employer may select the candidates in the candidate status chart 128, via the employer computing device 148. The filtering criteria may include job field, work experience, degrees earned, etc. In this way, the employer can select candidates whom have self-initiated the pre-screening process. Additionally, the pre-screening candidate manager may be further configured to associate the pre-screening candidate portfolio 110 with the ranked portfolio evaluation in the candidate status chart. In this way, an efficient and cost effective process may be used to rank pre-screening candidates.

At step 8, the pre-screening candidate manager 134 triggers the delivery of the offer packet 142 to an employer computing device 148 from the pre-screening database 118. However in other examples, the pre-screening database may be included in the pre-screening candidate manager 134 and therefore, the offer packet 142 may be sent directly from the pre-screening candidate manager 134 to the employer computing device 148, in some examples. The offer packet 142 may include a ranked candidate list 144 as well as a plurality of candidate portfolios 146 corresponding to the pre-screening candidates included the list. In this way, the independent pre-screening system 100 delivers a filtered list of potential candidates to the employer, thereby decreasing the hours of labor used by the employer in the hiring process. As a result, the cost of hiring an employee may be reduced.

In some examples, step 8 may be executed when a predetermined monetary value has been received via the pre-screening candidate manager 134, sent from the employer. In this way, the independent pre-screening system 100 can generate revenue. Furthermore, the number of pre-screening candidates included in the offer packet may be specified by the employer. The pricing scale of the offer packet may be based on the number of pre-screening candidates included in the offer packet. However, in other embodiments a flat fee may be paid for the offer packet regardless of the number of pre-screened candidates. In any case, before the employer is allowed to purchase an offer packet, the independent pre-screening system may verify that the employer is truly who they indicate they are.

The independent pre-screening system 100 shown in FIG. 1 allows pre-screening to be inexpensively performed by independent pre-screeners outside of the business, company, etc. The independent pre-screening system may be attractive to smaller businesses who have limited or no human resource (HR) personnel and/or a limited budget for hiring new employees. However, the system may also appeal to larger businesses or companies who are looking for ways to cut costs or reduce the workload of their HR departments. Therefore, the system may have a wide appeal to a variety of businesses.

It will be appreciated that the scalability of the independent pre-screening system, as well as the use of low cost labor over a network, such as the Internet, allows for efficient and low cost operation of the system. Therefore, the independent pre-screening system 100 shown in FIG. 1 may provide the aforementioned services to employers and pre-screening candidates at a very low price when compared to the cost of contracting the staffing work to external staffing firms or performing the staffing tasks in house.

Figure 2:
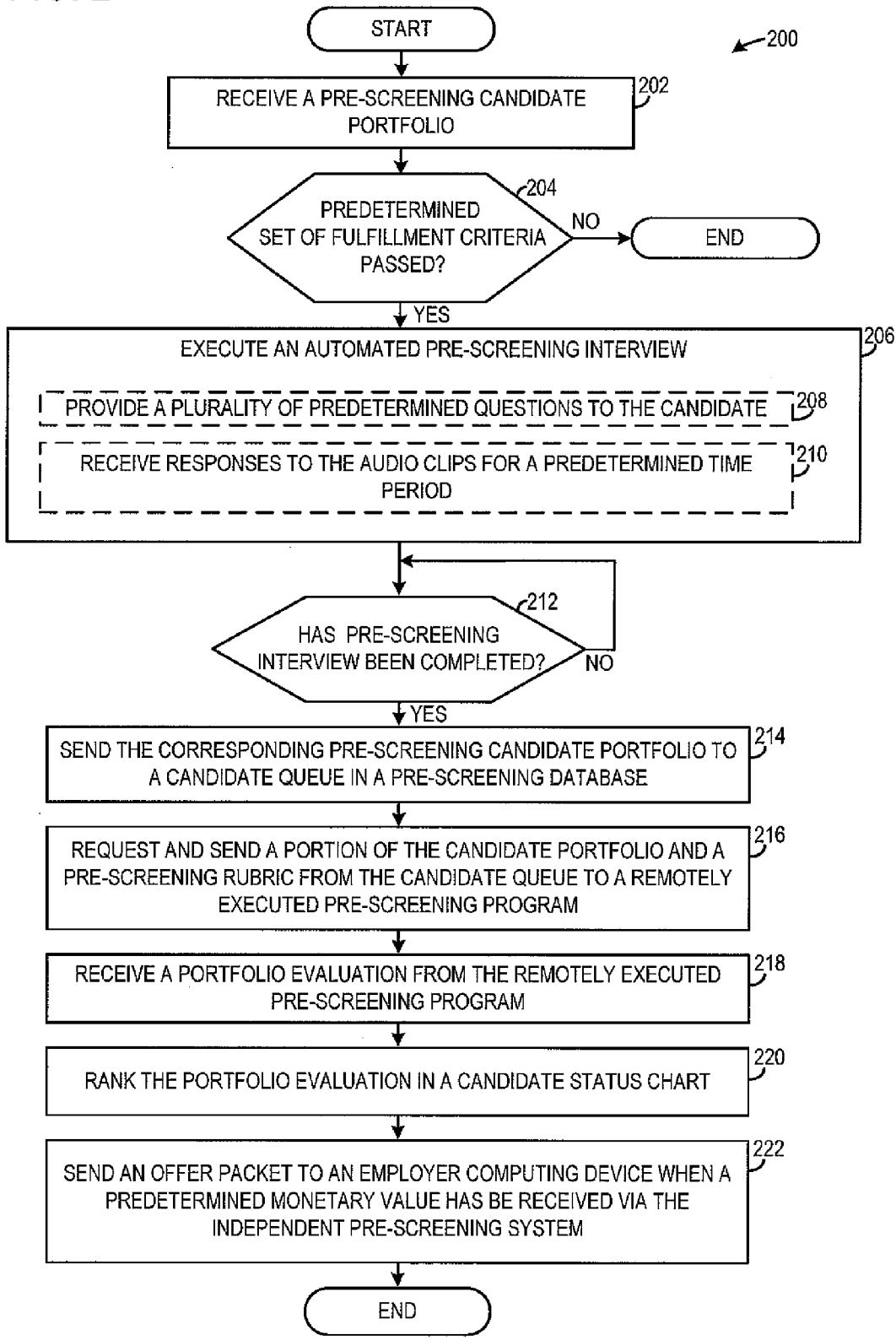
FIG. 2 shows a method for pre-screening a plurality of pre-screening candidates.

FIG. 2 shows a method 200 for pre-screening candidates for a job posting. Method 200 may be implemented via the independent pre-screening system described herein or may be implemented via other suitable systems, components, devices, etc.

At 202, the method includes receiving a pre-screening candidate portfolio. In some examples, the pre-screening candidate portfolio may be associated with a job posting. However in other examples, the candidate may self-initiate the pre-screening process, as discussed above with regard to FIG. 1. At 204 the method includes determining if the pre-screening candidate portfolio passes a predetermined set of fulfillment criteria. It will be appreciated that the predetermined set of fulfillment criteria may be established by the business, company, etc., associated with the job posting and/or via the independent pre-screening system. The fulfillment criteria may be altered for purposes of harmonization with internal policies, keeping up with employment law, categorizing jobs in newly emerging categories or technologies, etc. The fulfillment criteria may include a set of keywords, an online form which may include a plurality of required input fields, etc.

If it is determined that pre-screening candidate portfolio does not pass the predetermined set of fulfillment criteria (NO at 204) the method ends, or alternatively, the user is prompted to reenter information for the missing fulfillment criteria. It should be appreciated users may not be allowed to send candidate portfolios for which some required information is missing, rather the user may be prompted to reenter the missing information or abandon the application process.

However, if it is determined that the pre-screening candidate portfolio has passed the predetermined set of fulfillment criteria (YES at 204) the method proceeds to 206, where the method includes executing an automated pre-screening interview. In some embodiments, the automated pre-screening interview may be executed if a payment has been received by the prescreening system from at least one of a candidate, an employer, and a third party. The amount of the payment may be predetermined via the independent pre-screening system. Additionally, the third party may be an advertising firm or other suitable entity. The advertising firm may provide a pre-screening payment so that they can present adds to the employers and/or candidates. However, if a payment has not been received by the prescreening system from at least one of a candidate, an employer, and a third party, the automated pre-screening interview may not be executed. Commencing screening only after a payment has been received helps ensure that only candidates who are seriously interested in position apply to be considered for that position.

Executing an automated pre-screening interview may include at 208 providing a plurality of predetermined questions to the candidate and at 210 receiving responses to the questions within a predetermined time period. The predetermined questions may be provided by an employer associated with the job posting or the independent pre-screening system if a job has not been posted by the employer. It will be appreciated that providing the question to the candidate may include playing audio clips and/or presenting the questions on a GUI. Moreover, receiving responses may include recording an audio input or input from a keyboard or other input device. It will be appreciated that in other embodiment's executing an automated pre-screening interview may include alternate or additional steps.

At 212, the method includes determining if the pre-screening interview has been completed. In some examples, the automated pre-screening interview must be finished within a pre-determined period of time to be completed. The timed interview prevents the interviewee from preparing responses to the answers, providing a better assessment of the candidates' competence and preparedness.

If the pre-screening interview has not been completed (NO at 212) the method returns to 212. However if the pre-screening interview has been completed (YES at 212) the method includes at 214 sending the corresponding pre-screening candidate portfolio to a candidate queue in a pre-screening database. As previously discussed, the pre-screening rubric may be configured to be presented on a GUI and includes a resume rubric section for scoring a resume and an interview rubric section for scoring the automated pre-screening interview.

Next at 216 the method includes requesting and sending a portion of the candidate portfolio and a pre-screening rubric from the candidate queue to a remotely executed pre-screening program. At 218 the method includes receiving a portfolio evaluation from the remotely executed pre-screening program. As previously discussed, the portfolio evaluation may score the candidate portfolio. Next at 220 the method includes ranking the portfolio evaluation in a candidate status chart. In some examples, the candidate status chart may be associated with a job posting. However, in other examples, an employer may request generation of the candidate status chart when a job has not been posted. Specifically, the employer may request generation of a candidate status chart with candidates that meet selected requirements. In this way, candidates who have self-initiated the pre-screening can be viewed by an employer. Thus, the employer may not have to publicly post a job if they can find qualified candidates that have self-initiated their pre-screening. As a result, the duration of the hiring process for the employer is decreased.

At 222 the method includes sending an offer packet to an employer computing device when a predetermined monetary value has been received via the independent pre-screening system. In some examples, the employer computing device may be associated with a job posting. However, in other examples the employer computing device may not be associated with a job posting.

Figure 3:
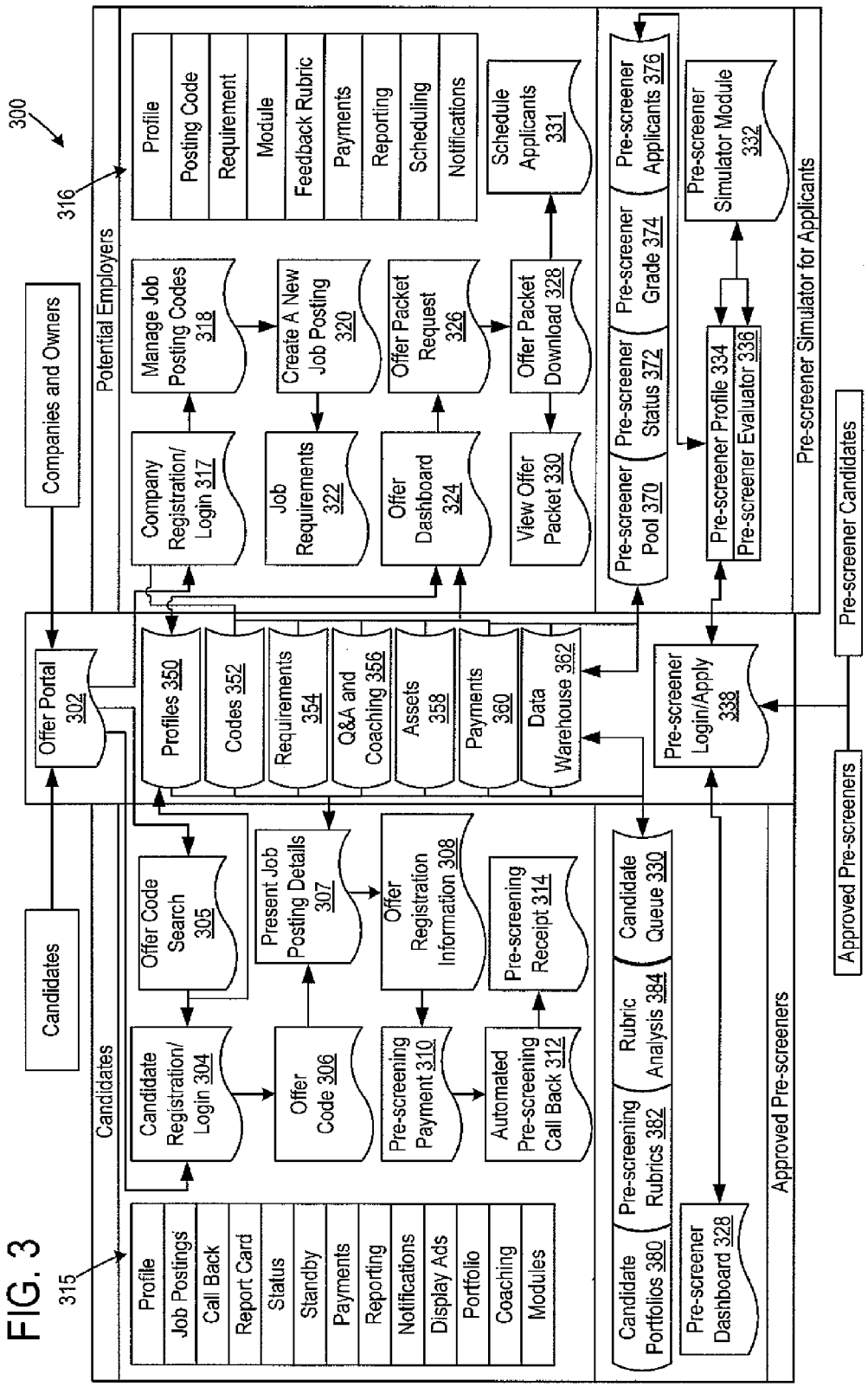
FIG. 3 shows a schematic depiction of another embodiment of an independent pre-screening system.

Now turning to FIG. 3, this Figure shows a second embodiment 300 of the independent pre-screening system 100, shown in FIG. 1. The independent pre-screening system 300 includes an offer portal 302 through which candidates, companies, and businesses may access the pre-screening system 300. It will be appreciated that the offer portal 302 may be associated with a job posting. However in other examples, the offer portal 302 may not be associated with a job posting. Candidates, companies, and pre-screeners may all access the independent pre-screening system. The offer portal 302 may be a web portal in some examples.

To access the independent pre-screening system 300, pre-screening candidates may register or login at 304. When the candidate logs in, the candidate's profile and/or settings may be displayed.

A pre-screening candidate may register with the independent pre-screening system via the following process. At 306 a candidate may enter or link directly to an offer code (e.g., alphanumeric symbols) via a computing device. In other examples, the candidate may search for an offer code at 305. The offer code may be published in print, on TV, on the Web, and/or on the radio, for example. Moreover, the offer code can also be encoded in 3D tags for mobile scanning/bookmarking. Employers may be able to track which offer codes are producing the best candidates, responses, etc. The offer codes and channels may be designed so that they are humanly readable. The offer code may have the following base code:

<offer vertical letter (J, R, B, etc.)>
<N for individual if applicable>
<a unique numeric user ID for N, or a unique numeric organization ID>
<sequential offer count for the individual or organization for a specific user account>
<incremental numeric distribution ID>
<channel type (W=Web, P=Print, T=Television, R=Radio)>

The base code structure allows the user to modify or add additional channels without affecting the search, linking and tracking results. Changing the distribution type does not affect or skew the results because the base code is resolved by parsing the distribution for a specific user.
If Offer Created by Individual:
(JobVerticalType)+(NHUserId)−(NextIdForIndividual); and
(JobVerticalType)+(NHUserId)−(NextIdForIndividual)−(IncrementalNumericDistributionId#)+(DistChannelLetter)
If Offer Created by Organization:
(JobVerticalType)+(OrganizationId)−(NextIdForIndividual); and
(JobVerticalType)+(OrganizationId)−(NextIdForIndividual)−(IncrementalNumericDistributionId#)+(DistChannelLetter)

EXAMPLES

Base code for job posting created by individual: JN453-423
Individual specifies a print distribution channel for the base code, it becomes: JN453-423-1P
Other Valid Offer Codes:
J3245-1-1T (In this example, we know it's the first offer for an organization.)
J3245-2 (In this example, we know it's the second offer for an organization.)

After creating an offer, the pre-screening system may assign a base code to the offer for immediate distribution. At any time the user can designate a desired distribution channel to the base code without affecting linking, reporting or search results. Additional distribution codes can be generated for an offer for immediate distribution. At any time, the offer's distribution channel type may be changed without affecting linking, reporting, and search results.

At 307, the job posting details may be presented to the candidate via the computing device. In this way, the candidates may be able to review and selectively indicate the preferred and required job requirements of a job posting before registering/applying. In some embodiments, the employer's contact information (e.g., employer's address, phone number, etc.) may be withheld from the job posting details. If the pre-screening candidate does not already have a user account, they are prompted to create one before proceeding.

However, in other examples the pre-screening candidate may self-initiate the pre-screening process. Therefore, the pre-screening candidate may select a job category (e.g., accounting, law, medical, engineering, etc.) and/or choose the criteria they are looking for in a job such as work days/hours, salary, benefits, location, etc. Further in some examples, the criteria may be used to automatically associate the candidate with a job posting. However, in other examples, the pre-screening candidate may generally log-in without providing the aforementioned information. In such an example, a self-initiated pre-screening dashboard may be provided to the candidate.

At 308, a candidate may provide registration information via the computing device, such as a complete demographics form, a completed references form, a completed general questionnaire form, and a complete resume form. In some examples, the candidate may upload a resume in a supported document format. This step may substitute the resume form with a portfolio of projects, customers, self-marketing (bidder/consultant pre-screening) or a financial form for evaluating personal credit (tenant pre-screening).

At 310, the candidate may provide a pre-screening payment. In other examples, the employer and/or a third party, such as an advertising firm, may provide the pre-screening payment. Specifically, the employer and/or third party may pay for a predetermined number (e.g., 25, 50, or 100) of pre-screening candidates. In this way, the independent pre-screening system 300 may generate revenue. However, in other examples, a payment may not be required by the independent pre-screening system 300. The payment may be electronic through a credit card service, an online based payment platform (e.g., PAYPAL®), etc.

Candidates may be required to agree with the fee for service terms. The payment terms may change and the pre-screening rate may fluctuate. If a coupon code was offered, the candidate may enter it at this step. The pre-screening candidate may also be shown what his total cost will be for the particular offer as it relates to pre-screening. Some offers may require additional pre-screening modules; a fee may or may not be associated with a module. The pre-screening candidate may be shown a line item invoice of all the modules that are bundled in the pre-screening fee.

At 312, the candidate receives an automated pre-screening interview. As previously discussed the automated pre-screening interview may provide a candidate with predetermined questions and record the candidate's responses to the questions. It will be appreciated that recording may include recording audio data as well as saving keyboard input data.

In one example the pre-screening interview may be include the following steps. A first step includes prompting the pre-screening candidate to enter a phone number that the pre-screening candidate can immediately be reached at. At a second step the independent pre-screening system calls pre-screening candidate and prompts the pre-screening candidate to enter a simple numeric code to confirm that the pre-screening candidate is the correct pre-screening candidate and that the pre-screening candidate can be reached at the number given. If the pre-screening candidate does not confirm and/or hangs-up prematurely, the independent pre-screening system may send a message to the pre-screening candidate's screen notifying the pre-screening candidate to enter another number or check the line. Call Availability Assurance (CAA) may also be implemented during the interview. CAA is designed to validate phone numbers, because it is important that the system reach the pre-screening candidate at the number specified or else the pre-screening interview cannot be carried out.

If CAA is implemented, the independent pre-screening system will check the number provided by the candidate before an initial phone call is made. The CAA may implement the following steps during the pre-screening interview: enter phone number, confirm that the pre-screening candidate is reached via the phone number, if the confirmation is validated then a timer is started. If the pre-screening candidate does not receive the call, the independent pre-screening system alerts the pre-screening candidate that they need to check the number they entered and/or enter a new number. Pre-screening candidates may also choose to try at a later time. Upon logging in, the system would instruct them to complete the pending interview within a specified period of time (e.g. 48 hours). A question review timer may be displayed after the phone number is verified by the pre-screening candidate. It will be appreciated that the question review timer may be presented on a GUI of a display accessible to the pre-screening candidate. When a question review timer is pressed, the interview questions may be displayed for a specified amount of time (e.g., 5 minutes).

The amount of time on the question review timer may be determined by the employer or via a manager of the pre-screening system. A receipt button may be displayed on a GUI when the timer reaches zero. The pre-screening candidate may receive a call at the end of the timer. The call may instruct the candidate to answer the questions within a specified amount of time. The independent pre-screening system 300 may then record the candidate's answers. If the call is not placed due to a system malfunction, the pre-screening candidate may be given a chance to repeat this step at a later time. The independent pre-screening system may only allow the pre-screening candidate one pre-screening interview per offer to prevent the candidate from preparing for the questions in advance. It will be appreciated that the method described above may be repeated multiple times for those pre-screening candidates that progress through multiple pre-screening levels.

At 314, the candidate may receive a pre-screening receipt notifying them that the pre-screening system has recorded the candidate's interview. This receipt may serve as verification that the candidate has actively been seeking work. It will document that the interview call was made, both time and date. It may also be appreciated that the candidate's GPA could be displayed on the receipt if they desire. This is especially important for government agencies that require proof that a person on unemployment is actively and legitimately seeking employment. However it will be appreciated that alternate candidate registration processes may be used in other embodiments.

Each candidate may be provided with a profile interface, job posting interface, report card interface, status interface, standby interface, payment interface, reporting interface, a notification interface, display add interface, portfolio interface, coaching interface, and module interface as shown at 315. Additionally, returning job candidates may login and register for new job postings within the independent pre-screening system via the following process.

Employers (e.g., companies, businesses, agencies, etc.) may access the independent pre-screening system and create a job posting via the following process. Each employer may be provided with a profile interface, posting code interface, requirement interface, module interface, feedback rubric interface, payment interface, reporting interface, scheduling interface, and notifications interface as shown at 316.

At 317, the employer may login/register and complete a company information/owner form via a computing device. At 318, the employer manages job posting codes, which may include modifying, monitoring, and generating job posting codes for advertising/publishing channels. At 320, the employer may create a new job posting. The new job posting may specify the type of position offered, the compensation (e.g., monetary, benefits, vacation, etc.) for the job, a requirement checklist (or offer requirements) for the job, the start and expiration date of the job posting, associated job resources (e.g., documents, videos, photos, etc.), employment forms, pre-screening questions and answers. At 322 the employer may determine to job requirements. The job requirements may include type of degrees earned, keywords in the resume, years of experience, etc.

At 324, the employer will have access to an offer dashboard. The offer dashboard may provide information pertaining to the number of pre-screening candidates that have applied for a job posting as well as the pre-screening candidates' qualifications, background, etc. The offer dashboard with job postings may be accessible to the employer throughout the pre-screening process. In this way, the offer dashboard may provide the employers with updates on how the hiring process is progressing. When the employer has not posted a job, the employer may have access to a general dashboard enabling them to search through candidates that have self-initiated the pre-screening process. The general dashboard may provide filtering criteria to the employer such as level of education, job field, years of experience, etc.

Figure 17:
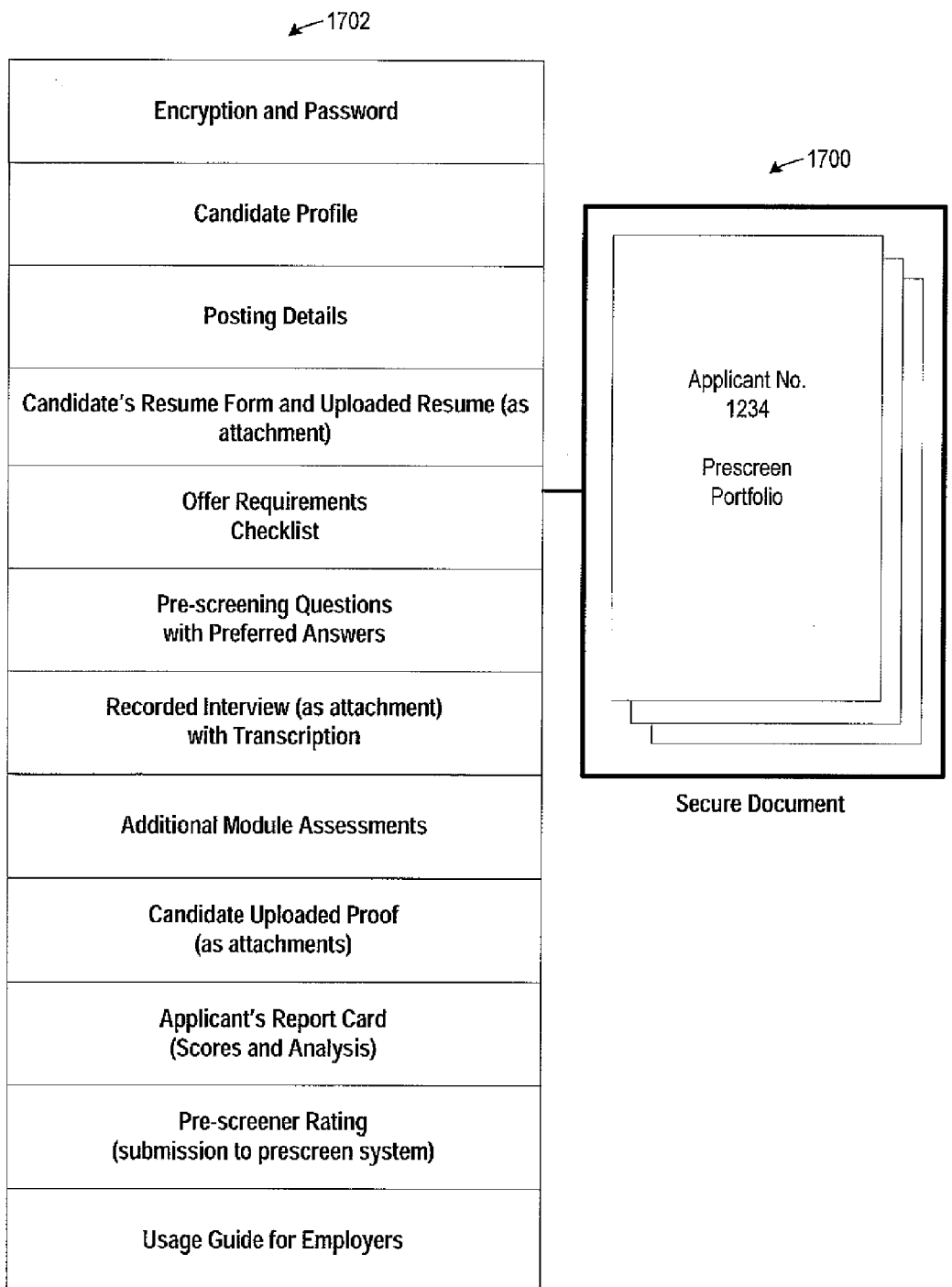
FIG. 17 shows a plurality of candidate portfolios in the independent pre-screening system.

At 326 the employer requests an offer packet and 328 the employer downloads the offer packet. At 330 the employer views the offer packet. An offer packet may include a set of ranked pre-screening candidates as well as a plurality of associated pre-screening candidate portfolios including pre-screening candidate resumes, interview files, and other resource collateral collected, as shown in FIG. 17 discussed in greater detail herein. Furthermore, after the employer views the offer packet the employer may schedule appointments with the candidates at 331.

Continuing with FIG. 3, in some examples, the pre-screening candidate's contact information may be withheld from the offer packet until the employer has provided a payment to the independent pre-screening system. In this way, the employer cannot utilize the information in the offer packet to contact the candidates without purchasing the offer packet. For example, an employer dashboard may be provided by which the employer can select to download each offer packet for a fee. The offer packets may be stored at the service for a period of time, or longer, for a fee, if desired. It will be appreciated that in some examples, purchasing the offer packet may enable the employer to download completed pre-screened candidate portfolios including the pre-screening candidate's contact information. It will be appreciated that in some examples, the offer packet may be downloaded by the prospective employer free of charge by having a third-party pay for or sponsor the pre-screening service.

U.S. employers are required to complete and retain a Form I-9 for each individual they hire for employment in the United States. On the form, the employer must examine the employment eligibility and identity document(s) an employee presents to determine whether the document(s) reasonably appear to be genuine and relate to the individual and record the document information on the Form I-9. Other forms may also be embedded or externally linked to the candidate's portfolio.

The independent pre-screening system 300 may also be used to hire pre-screeners. The following process may be used to hire pre-screeners. The following process may be referred to as a pre-screener simulator.

The pre-screener simulator may be automated (e.g., carried out via a computing device). How the pre-screener grades a candidate portfolio within the candidate simulator may be one factor in evaluating a pre-screener's ability. In some embodiments the pre-screener's interaction or compliance with the pre-screener simulator queue may also be a factor in evaluating a pre-screener's ability. In some examples, the simulator may last for up to a few days. In this way, a pre-screener's competency as well as work ethic can be better assessed. Further in some examples, the simulator may use real, yet anonymous "pre-screening candidates", to ensure the privacy of pre-screening candidates.

The pre-screening system automates the hiring, managing and firing of pre-screeners without the need for human interaction. For at least some pre-screening verticals, employers may add modules to augment and enhance the pre-screening simulator. A pre-screening simulator module 332 is provided in the independent pre-screening system to carry out the aforementioned functionality. A pre-screener profile 334 may be selected from a pre-screener pool 370 and/or pre-screener applicants 376. A pre-screener evaluation 336 may be used to judge the performance of the pre-screener. Thus, the pre-screener evaluation 336 may be used to determine a pre-screener's status 372 and a pre-screener's grade 374.

Further in some examples, the pre-screeners may be approved or denied through the following process. At 338, a "pre-screener candidate" may login/apply. The pre-screener candidate may be prompted to upload a resume, answer a questionnaire, and fill out demographic information, such as personal information. The same process for pre-screening candidates will be available to pre-screener candidates.

In a second step, a pre-screener candidate may set-up his profile in the following manner. The pre-screeners may follow the same process that "pre-screening candidates" undergo, but with the following additional information: the industries/occupations in which the pre-screener has experience. Pre-screeners may select one or more simulators e.g. jobs, projects, rentals, software support, medical, etc.

In a third step, the pre-screener simulator module 332 may be executed. Executing the pre-screener simulator may present the pre-screener with a prescreening packet, a select number of previously graded candidate portfolios that have an established score, and a simulator rubric. The rubric may provide the grading criteria for grading the candidate's audio interview as well as the resume. The pre-screener may be allotted a predetermined amount of time to complete the pre-screening simulator (e.g., grade pre-screening candidate portfolio). After the pre-screening simulator has been completed the independent pre-screening system may evaluate the pre-screener. The pre-screener may be evaluated based on one or more of the following criteria: the time needed to complete the simulator, the grading of the candidates (previously graded candidate portfolios may establish the criteria for passing or failing of the simulator), and information provided during pre-screening (e.g., resume, referrals, questionnaire, recorded interview, etc.). Subsequently the pre-screener may be approved or denied based on an evaluation.

After a pre-screener is approved he/she may access the independent pre-screening system 300 via the following process.

The pre-screener may login and view a pre-screener dashboard at 338. The pre-screener dashboard will present all past and current pre-screening analytics associated to the pre-screener. The dashboard may display the pre-screener's registered verticals, pending verticals, and unregistered verticals.

Next, the pre-screener may access a pre-screening candidate queue 330 from the dashboard 328, which will present the cumulative results and achievements of the pre-screener. The candidate queue may include ungraded candidate portfolios. As previously discussed the queue may be included in a pre-screening database.

Next, the pre-screener may access one or more candidate portfolios 380 via the dashboard 328. It will be appreciated that once a candidate portfolio is accessed or downloaded via the pre-screening dashboard or remotely executed program it will be removed from the candidate queue, preventing a single portfolio from being graded via multiple pre-screeners. Next the pre-screener may access one or more rubrics 382 and/or rubric analysis 384 via the dashboard 328. Then the pre-screener may grade resume and/or interview in the candidate portfolio. Pre-screeners may be compensated for each completed pre-screening. The payment rate may fluctuate. Prior to commencing work, a pre-screener must acknowledge and agree with the currently established rate.

Profiles 350, codes 352, requirements 354, question and answer (Q and A) coaching 356, assets 358, payments 360, and a data warehouse 362 may also be included in the independent pre-screening system 300. The aforementioned constituents may be used the implement the functionality of the independent pre-screening system 300 described above.

Figure 4:
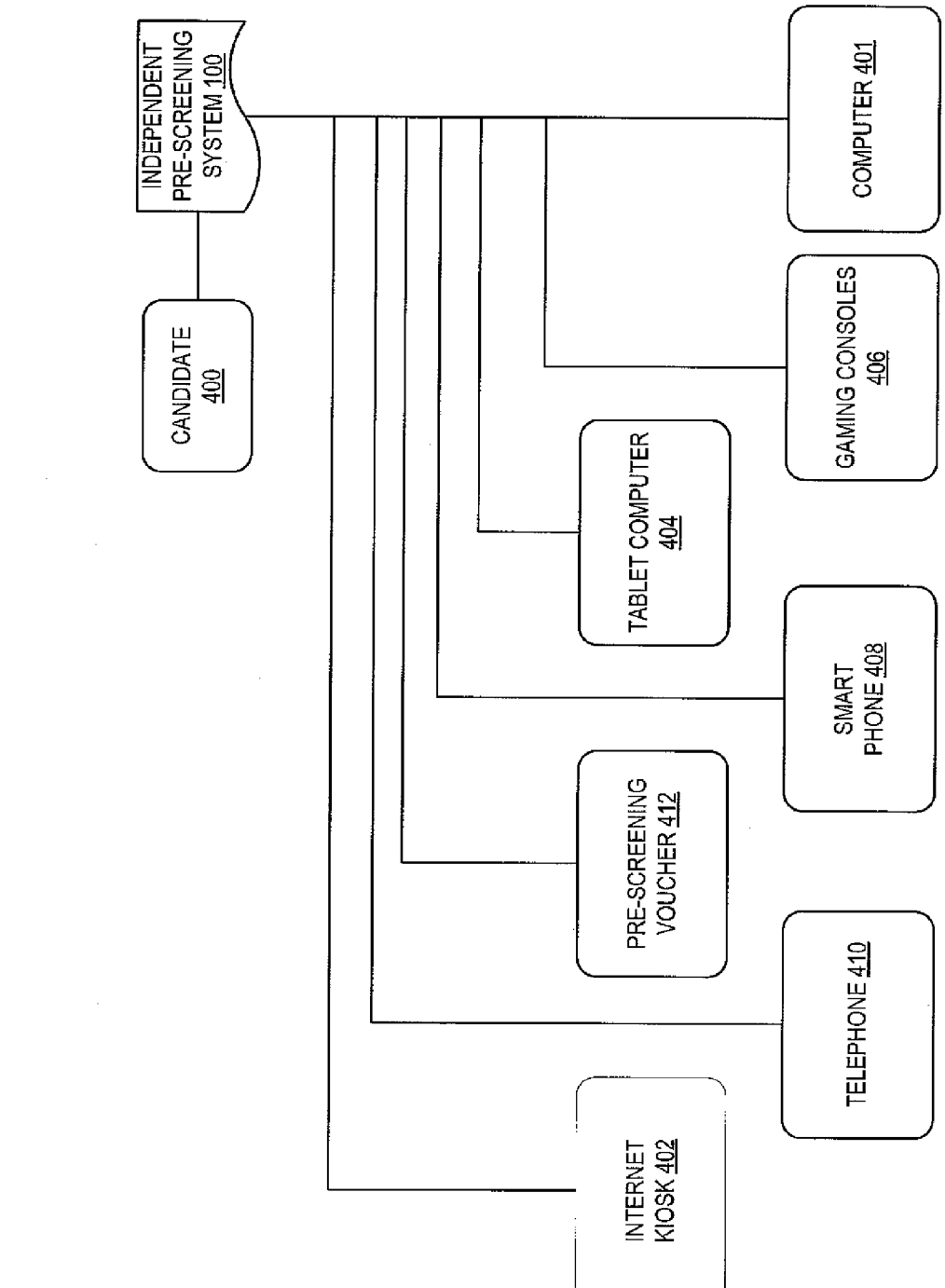
FIG. 4 shows a schematic depiction of a plurality of devices that may be used to access the pre-screening system.

FIG. 4 shows a depiction of various computing devices and communication devices that may be used by a candidate 400 to access the pre-screening system 100, shown in FIG. 1. The computing devices may include a computer 401, an Internet kiosk 402, a tablet computer 404, and a gaming console 406. The communication devices may include a smart phone 408 or a telephone 410. FIG. 4 also illustrates a pre-screening voucher 412 that may be used in conjunction with a telephone to access the pre-screening system. For example, an employer may hand out a pre-screening voucher to pre-screening candidates. The voucher may include a phone number as well as an offer code. The candidates may then call the number and "key-in" or speak the offer code. In this case the pre-screening system would bill the pre-screening candidate or employer after the telephone interview portion of the pre-screening. The candidate may be required to go online to complete the remaining offer requirements which are normally done before the telephone interview. The pre-screening candidate portfolio may not be processed if payment is not made. The candidate may be prompted to enter the unique voucher number at the point of payment. In this manner, pre-screening candidates who are not serious about applying may be vetted through the voucher process and removed from the pre-screening process.

FIGS. 5-34 show a plurality of example GUIs that may be executed via the independent pre-screening systems 100 and 300 shown in FIGS. 1 and 3 respectively. It will be appreciated that the GUIs shown in FIGS. 5-24 may be presented on a display associated with or integrated into the computing devices included in the independent prescreening systems 100 and 300.

Specifically, FIGS. 5A and 5B respectively show a first GUI 500 and a second GUI 502 which enable a pre-screener to login to the pre-screening system 100, shown in FIG. 1 as well as set-up a pre-screener profile in the independent pre-screening system. As shown, a candidate may enter a password and a username in the first GUI 500 or may enter personal information such as a name, phone number, email address, address, etc., to login and/or register to the independent pre-screening system 100 shown in FIG. 1

Figure 6:
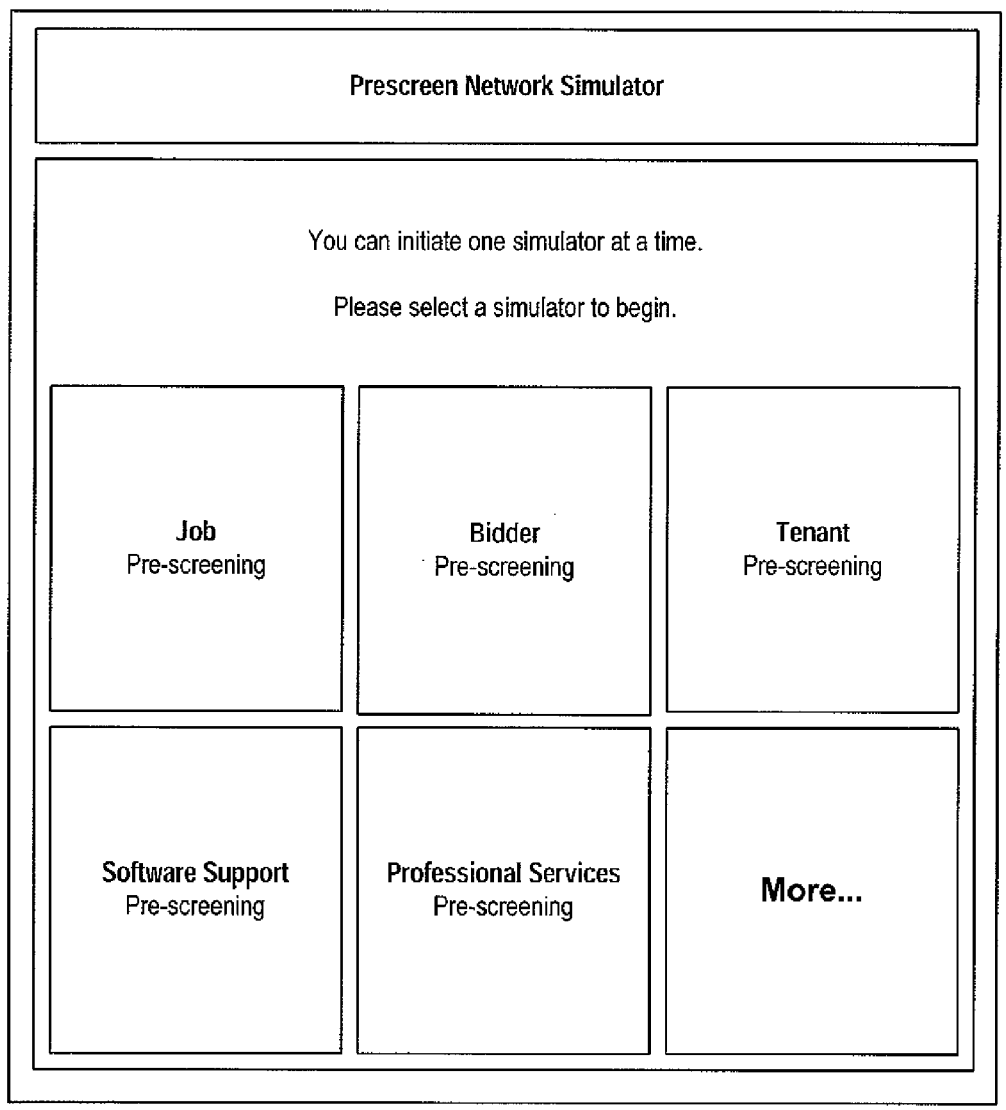
FIG. 6 shows a GUI that may be presented on a display when a pre-screener candidate is electing to be tested by a particular pre-screener simulator the candidate wants to qualify for in the independent pre-screening system.

FIG. 6 shows a GUI 600 that may be presented on a display when a pre-screener candidate is electing to be tested by a particular pre-screener simulator the candidate wants to qualify for. As shown the pre-screener candidate may select from a plurality of simulators.

FIG. 7 shows a GUI 700 that may be presented via the pre-screening system after the pre-screening simulator is select in GUI 600 shown in FIG. 6. As shown, a plurality of candidates may be scored via the pre-screener.

Figure 8:
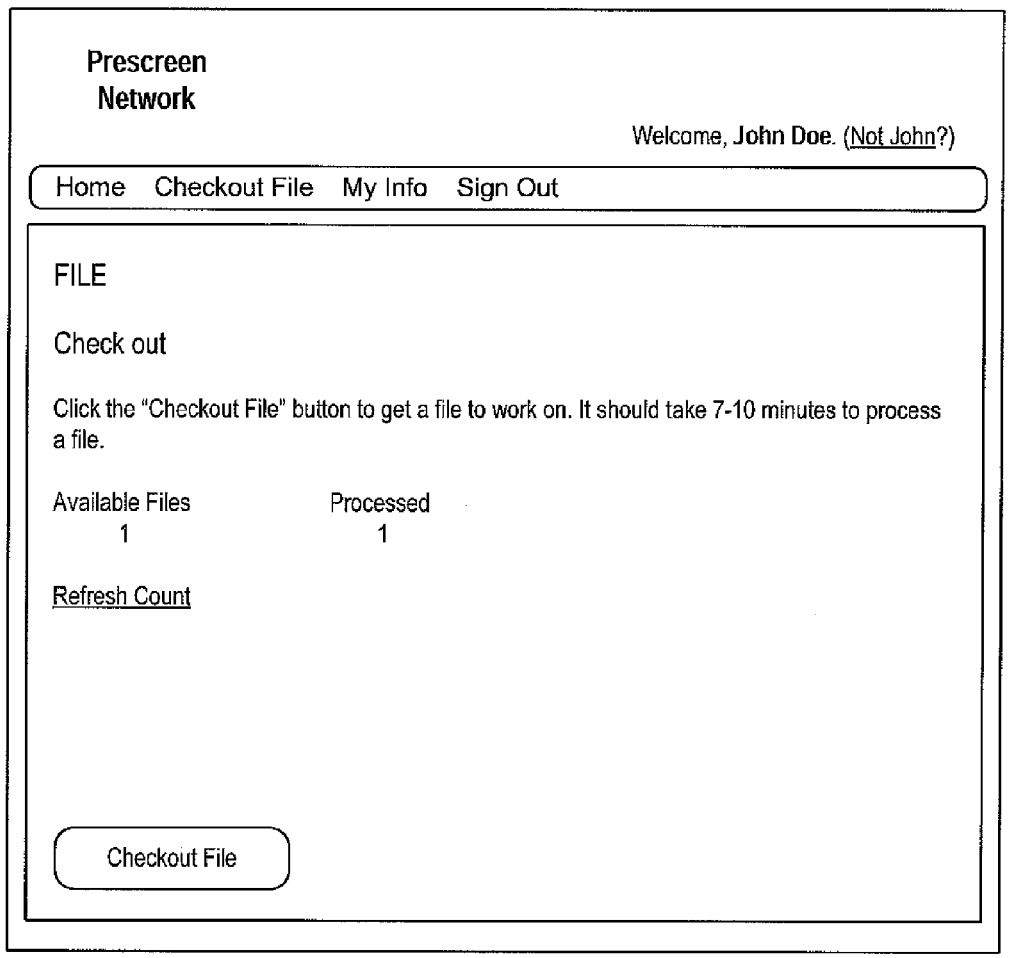
FIG. 8 shows a GUI that may be presented to the pre-screener when the pre-screener checks out of a candidate portfolio for pre-screening in the independent pre-screening system.

FIG. 8 shows a GUI 800 that may be presented to the pre-screener when they check out of a candidate portfolio for pre-screening.

FIGS. 9-14 show a plurality of rubrics that may be used by the pre-screener to grade a candidate. It will be appreciated that two or more of the GUIs shown in FIGS. 9-14 may comprise a single rubric in some examples.

Specifically, FIG. 9 shows a GUI 900 in which a rubric for grading a resume is presented. The resume rubric contains categories such as attractiveness and content information as well as grade levels such as good, poor, and fair. A second GUI 902 is shown in FIG. 9 displays the details of the job posting which the candidate is applying for.

FIG. 10 shows another GUI 1000 displaying a resume rubric portion and a GUI 1002 displaying eligibility requirements for the candidates resume. The eligibility requirements include a predetermined number of years of experience in a number of fields.

FIG. 11 shows a GUI 1100 displaying a graded resume rubric in which grades for each of the rubric categories are selected. FIG. 11 also shows GUI 1102 displaying the candidate's resume.

FIG. 12 shows a GUI 1200 presenting an interview rubric. As shown, the interview rubric includes categories such as question numbers, tone, clarity, and coherence and grades (e.g., poor fair, and good) for each category. FIG. 12 also shows a GUI 1202 presenting the interview file. It will be appreciated that the GUI 1202 enables a pre-screener to play a candidate's interview. However, in other embodiments, the candidate's interview may be transcribed in text.

FIG. 13 shows a GUI 1300 presenting another interview rubric. As previously discussed, the interview rubric may include categories such as question numbers, tone, clarity, and coherence, and grades (e.g., poor fair, and good) for each category. In this way, the pre-screener is given guidelines for grading the candidate.

FIG. 14 shows a GUI 1400 presenting another exemplary resume rubric. FIG. 15 shows GUI 1500 displaying a feedback rubric for grading a pre-screener. In this way, the pre-screener work can be evaluated. FIG. 16 shows GUI's 1600 and 1602 which may be used by an employer to download a candidate offer packet. As shown the employer may filter the offer packet based on criteria such as the candidate's grade.

FIG. 17 shows a plurality of candidate portfolios 1700 and constituent data types 1702 that comprise each of the candidate portfolios 1700. The data types may include encryption data and passwords, a candidate's profile, job posting details, Candidate's Resume Form and Uploaded Resume, Offer Requirements Checklist, Pre-screening Questions with Preferred Answers, recorded interviews, Additional Module Assessments, Candidate Uploaded Proof, Candidate's Report Card, a Pre-screener Rating, and Usage Guide for Employers.

Figure 19:
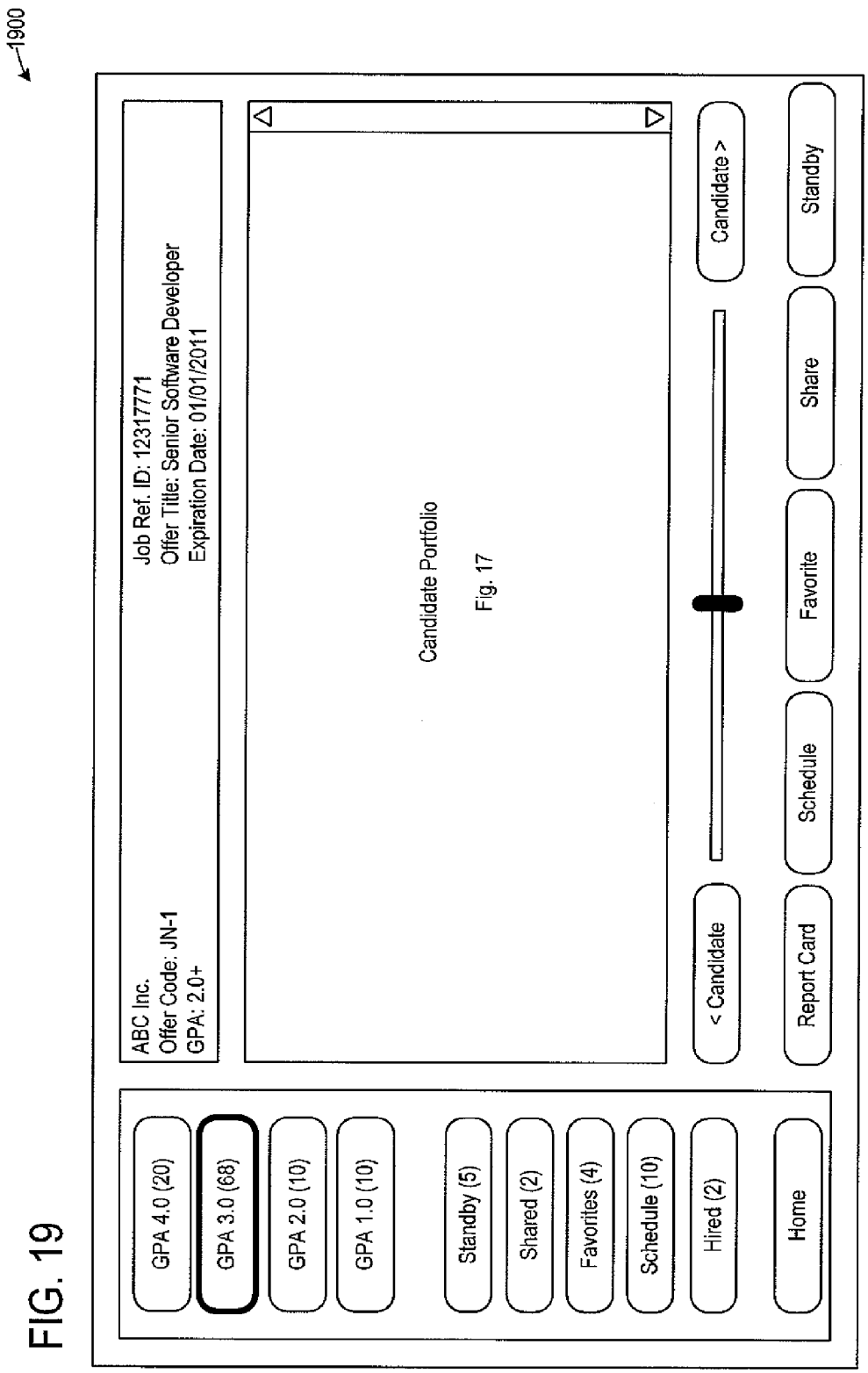
FIGS. 19 and 20 show GUIs for managing job postings in the independent pre-screening system.
Figure 20:
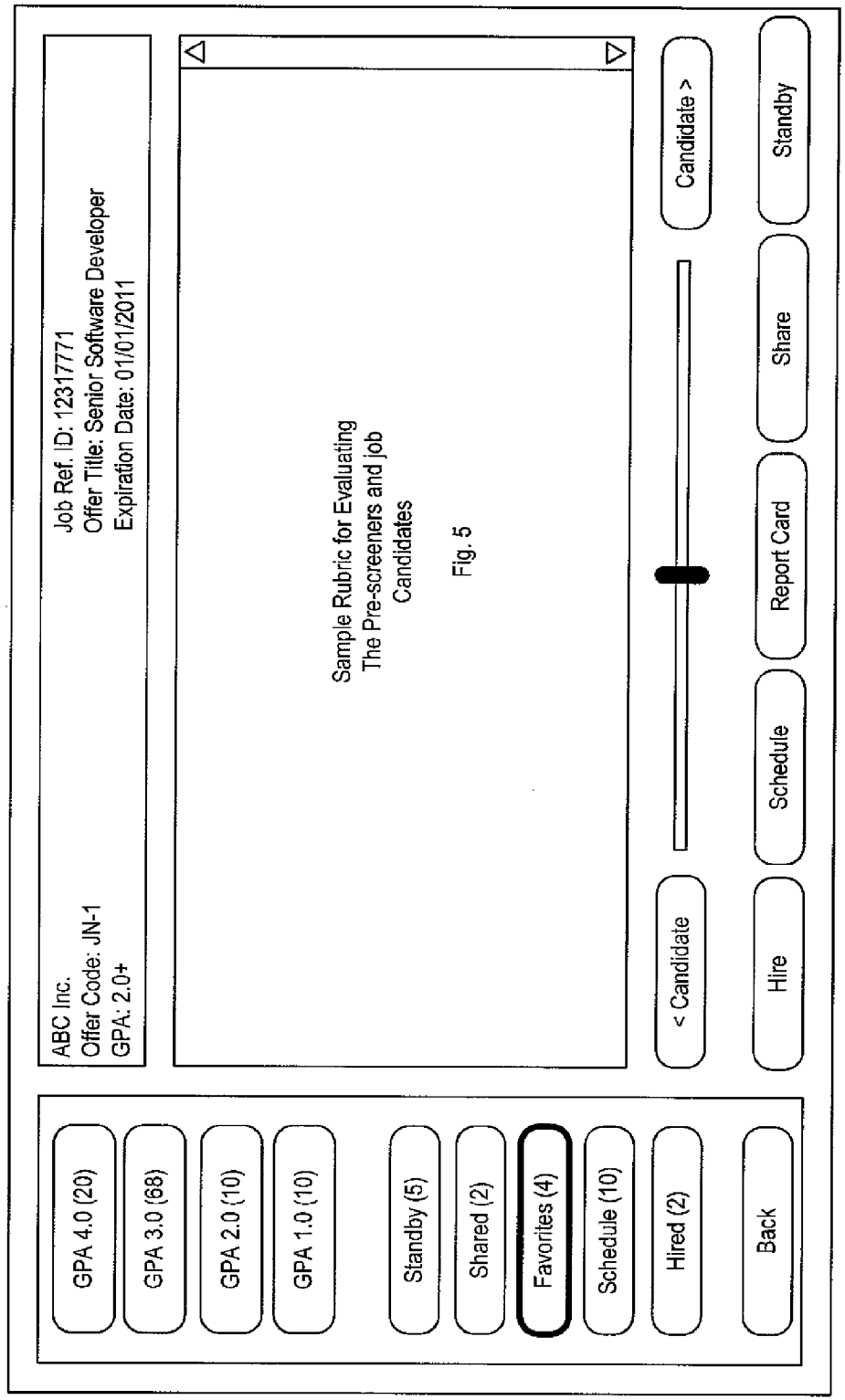

FIG. 18 shows an exemplary GUI 1800 displaying a plurality of job postings. FIGS. 19 and 20 show GUIs 1900 and 2000, respectively, displaying job posting and functionalities for managing job postings. FIG. 21 shows a GUI 2100 that may be used to create a job posting. As shown various criteria may be entered such as job, job title, job description, etc.

Figure 24:
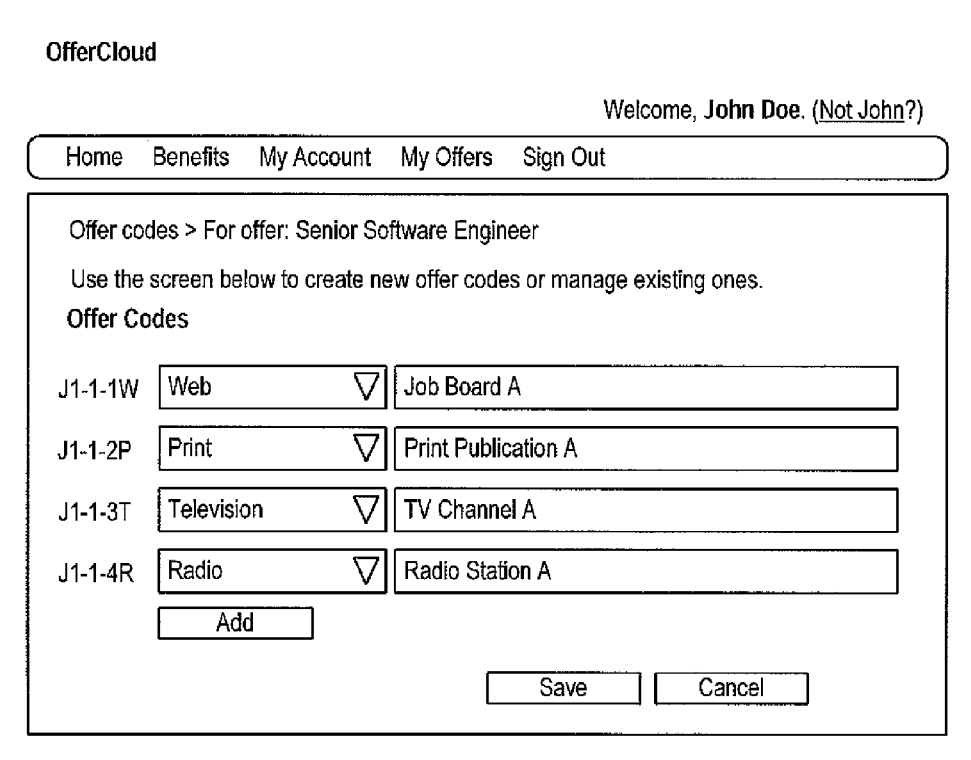
FIG. 24 shows a GUI that may be used to generate offer codes in the independent pre-screening system.

FIG. 22 and show other GUIs 2200 and 2202, respectively, that may be used to create a job posting. FIG. 23 shows a GUI 2300 that may be used to generate pre-screening questions for the candidates. It will be appreciated that the GUI 2300 may be used by the employer. FIG. 24 shows a GUI 2400 that may be used to generate offer codes for one or more publication channels. As shown the offer codes may be presented in a variety of forms such as on the web, in print, on the television, and on the radio. It will be appreciated that the offer codes may provide links to job postings in the independent pre-screening system 100 shown in FIG. 1

FIG. 25 shows a GUI 2500 that may be used to present a job posting dashboard. The job posting dashboard displays both found job postings and created job postings. FIG. 26 shows a GUI 2600 that may be used by an employer to customize notification letters sent to a candidate. FIG. 27 shows a GUI 2700 that may be used to search for offers by entering an offer code. FIG. 28 shows a GUI 2800 that may be used as the login page for both pre-screening candidates and/or employers. The same USER ID and PASSWORD may be used to apply for found postings and created postings.

Figure 32:
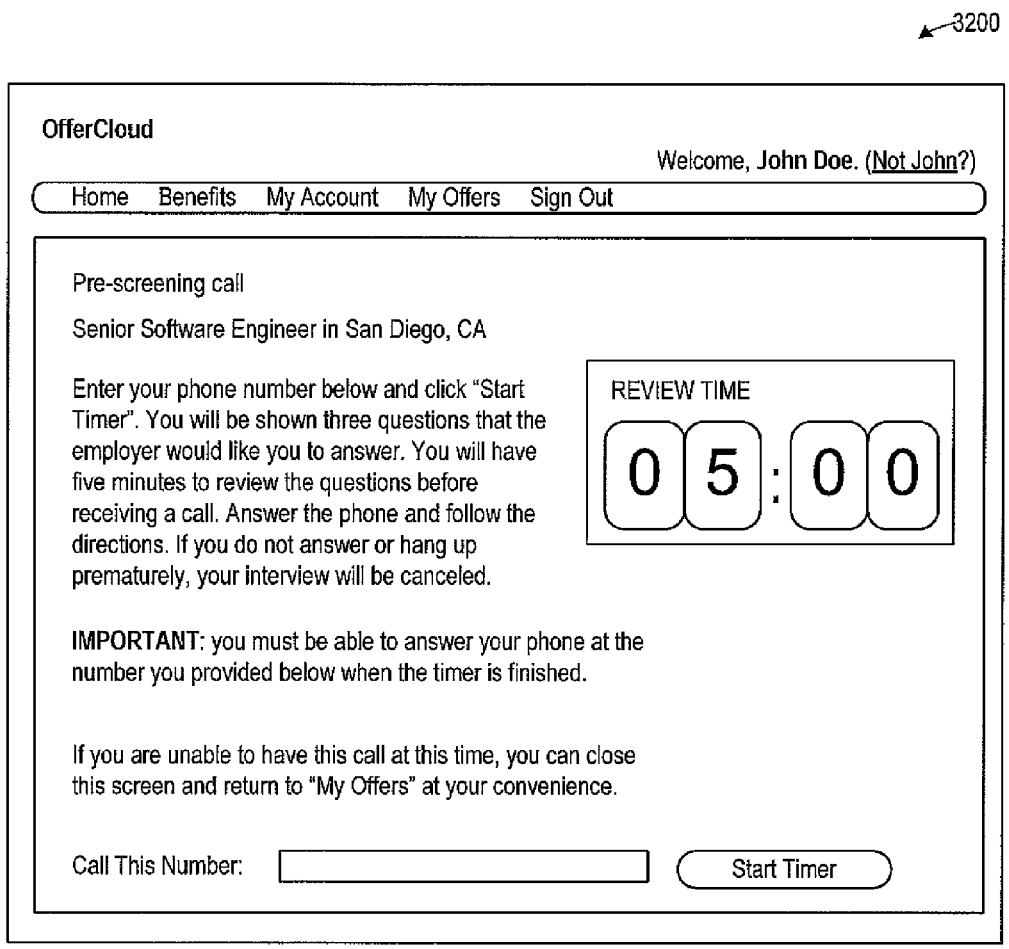
FIG. 32 shows a GUI for entering and verifying the pre-screening candidate's telephone in the independent pre-screening system.
Figure 34:
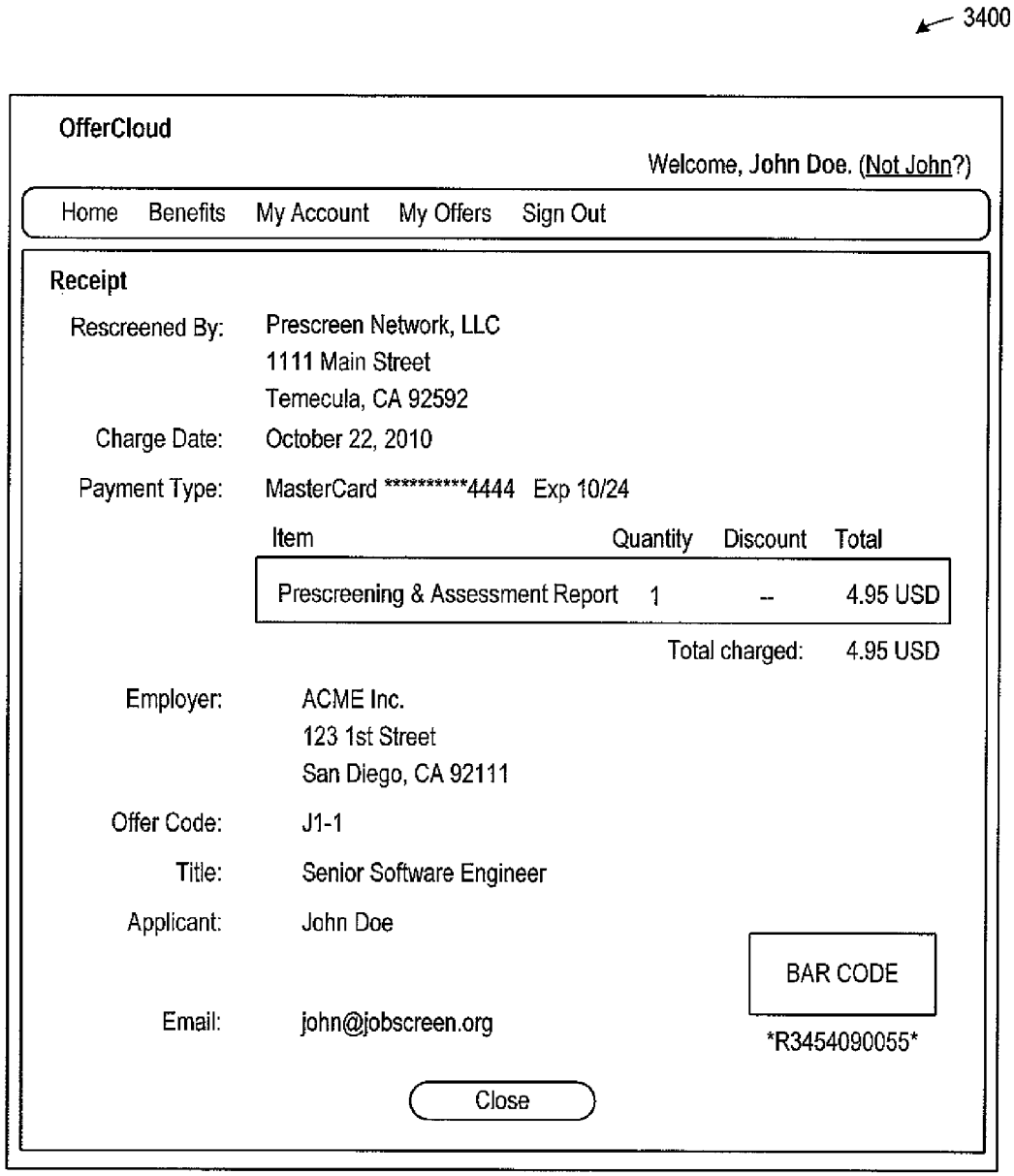
FIG. 34 shows a GUI presenting a pre-screening receipt in the independent pre-screening system.

FIG. 29 shows a GUI 2900 that may be used by a pre-screening candidate to register for a job posting. FIG. 30 shows another GUI 3000 that may be used by a pre-screening candidate to register for a job posting. As shown, the candidate may enter various data such as career goals, resume, employment history, etc. FIG. 31 shows a GUI 3100 configured to accept a payment from a pre-screening candidate. As shown, fields are provided in GUI 3100 that enable a candidate to enter payment and personal information. In this way the independent pre-screening system may generate revenue. FIG. 32 shows a GUI 3200 for entering and verifying the pre-screening candidate's telephone number at which they can be reached for the telephone interview. Upon confirming availability, the timer starts, interview questions are displayed and when the timer elapses, the call is initiated and the interview begins. FIG. 33 shows a GUI 3300 that may be used to present interview questions to a pre-screening candidate. FIG. 34 shows a GUI 3400 presenting a pre-screening receipt that may be provided to a pre-screening candidate after a pre-screening interview has been completed.

The independent pre-screening systems 100 and 300 shown in FIGS. 1 and 3 respectively may also exhibit the additional functionality described below. Candidates may be put in standby status. For example, candidates that receive a high GPA, but are not hired may be placed on a standby list. Employers may be able to rank their standby choices by deciding what candidate portfolios are acceptable. The pre-screening system may alert those candidates that the employer has chosen to place on a standby list. The pre-screening system will remind standby candidates to keep their information current. If a standby candidate is requested, they will not have to be pre-screened and may not be required to pay any additional fees. Employers may repurchase an offer packet. The pre-screening system would contact the candidates based on their GPA and ranking, and give certain candidates who were placed on a standby list previously, a second chance to make the cut. These candidates would be able to update their personal information and resume without paying a fee.

The independent pre-screening system may also provide fraud protection. For example, pre-screeners and candidates may be encouraged to report any suspicious offer that may be fraudulent. Reporting is achieved by flagging offers that are suspicious. Employers are monitoring pre-screeners for quality evaluations, pre-screeners are evaluating candidates for eligibility, the pre-screening system is monitoring pre-screeners for compliance, and pre-screeners and candidates are monitoring employer submitted offers for fraud. Pre-screeners or candidates may flag offers that are deemed suspect.

Pre-screeners may be enlisted to review employer published offers to reduce fraud. Employers may be verified through their telephone number, business license or Employer Identification Number (EIN). Before hiring employees, companies are normally required to get an employment identification number (EIN) from the U.S. Internal Revenue Service. The EIN is often referred to as an Employer Tax ID or as Form SS-4. The EIN is necessary for reporting taxes and other documents to the IRS. In addition, the EIN is necessary when reporting information about employees to state agencies. Pre-screeners may know from where the offer was referred, they will see a snapshot view of proof required, business license, pre-screener fraud alert, phone verification, Offer Completion rating, etc. IP check, reverse phone lookup, referral origin, referring URL, Key word filtering and other automated checks, may be employed to determine suspect offers.

The independent pre-screening system may also grade pre-screeners. Specifically as one example, pre-screeners may be graded by employers, if they grade low, or consistently low, they will be notified. They may be limited or barred from pre-screening a vertical category if they show no improvement. This process can be automated.

The pre-screener simulator may also be used to conduct quality assurance (QA) on pre-screeners after they have been approved. The pre-screening system may queue simulator offers for the purpose performing QA on particular pre-screeners that have been flagged by the system, and/or employers. In this way, the independent pre-screening system may be improved.

Self-critiquing one's audio interview would help candidates improve their overall presentation skills and pinpoint areas of where improvement is needed. Thus, the independent pre-screening system may enable candidates to listen to their own audio interviews, and may provide a mechanism for the candidate to request feedback from the system regarding interview performance, or may provide a confidential mechanism to submit the audio interview to an approved independent employment counselor for review and feedback to the candidate.

Furthermore, pre-screeners may be asked what their current and past occupational experiences and titles are/were to appropriately match pre-screeners with offers in the same industry in which the pre-screeners have experience.

Additionally, pre-screeners may receive demerits in the independent pre-screening system if they do not process candidate portfolios as set by the pre-screening guidelines. The pre-screening system may allow the pre-screener to check out the offers which they are most familiar with until all candidate portfolios are completely removed from the queue. This allows the pre-screener to remain efficient and focused. Offers may be limited to a specific number of pre-screeners. For example, when an offer is created the independent pre-screening system may assign a specific number of pre-screeners to the offer with the ability to increase the number of pre-screeners if there is spike in submissions or in the event some of the assigned pre-screeners become unavailable. Pre-screeners may be assigned offers that they have qualified for based on their simulator GPA. Employers may have access to all the submissions and they are free to evaluate all or part of the submission following their own internal standards and criteria. An offline client application designed to organize candidate portfolios may help the offer manager keep things organized. It may also help employers to comply with state laws regarding the archiving of job applications before and after hiring.

The independent pre-screening system may further be configured to enable employers to pre-screening prospective candidates before the pre-screening system pre-screens the pre-screening candidates without requiring a direct exchange or interaction with the pre-screening candidates. The offer requirements page may establish what is required and what must be proved. If these items are not fulfilled, the candidate may not be able to pass-through to the pre-screening system. The pre-screening system is responsible for grading, and segregating the candidates by GPA for employers to review for hiring. Additionally, the independent pre-screening system may be configured to trigger status notification emails after pre-screening and/or completion of one or more modules. The notification may include GPA and coaching information.

Additionally, the independent pre-screening system may also be configured to provide pre-screening candidates with notifications of similar job postings. This may include pre-screening candidates that complete the pre-screening process, as well as those that are unable to. This gives employers an immediate pool of pre-screening candidates to draw from. Additionally, the job listings in the independent pre-screening system may be managed and tracked through an offer code that is socially shareable. Moreover, the independent pre-screening system may notify pre-screeners when the candidate queue is populated with candidate portfolios. Approved pre-screeners may decide how frequently they want to be notified and how they want to be notified (e.g. email, SMS, TWITTER®, etc.). As independent contractors, they decide how, when and where they choose to pre-screening candidate portfolios. As the candidate queue is populated, the pre-screening system may send alerts to pre-screeners notifying them that candidate portfolios are available for pre-screening.

Furthermore, the independent pre-screening system may be configured to build the offer requirements in the system with the assistance of progressive intelligence. In this way, employers are allowed to create offer requirements with little knowledge or experience. The employer may select the target industry for hire (e.g., finance). Upon selection the employer would be given intelligent suggestions for job titles (e.g., accountant). Intelligent suggestions for job skills & experience are suggested based on the industry and job title (e.g. QUICKBOOKS® experience). Intelligent suggestions for pre-screening questions can be sourced from other employers targeting the same parameters. By utilizing a customized tag cloud control as opposed to multiple standard dropdown lists, the user is able to dynamically query a server-side database more intuitively and quickly. The aggregate intelligence improves over time as more users participate. Multiple levels of relevance are displayed in the tag cloud list.

The independent pre-screening system may also include an application programming interface (API). The API may allow other websites and systems to access the pre-screening system. The API may allow, for example, a job board site to offer their customers (employers) the ability to pre-screening candidates that come through their system. The API may give the appearance that the job board is pre-screening the candidate.

The independent pre-screening system may also be configured to require pre-screening candidates that receive a notification letter to upload information. Employers may require that the pre-screening candidate upload the information before setting up a face-to-face interview or alternatively as described in the paragraph below. In some examples, pre-screening candidates may decline to upload proof documents prior to meeting with the prospective employer by checking a box that says: "I respectfully decline to upload this sensitive information at this time." This may reflect negatively on the candidate's GPA. The employer may prefer to know that all requirements which require proof of some type have been uploaded prior to a scheduled interview by the employer. The workflow described in the paragraph below addresses how the latter is accommodated by the independent pre-screening system.

For increased security and privacy, the pre-screening candidate may be the only one able to grant access to sensitive data uploaded (e.g. driver's license, passport, birth certificate, health records, etc.). The act of uploading documents affirms that the pre-screening candidate has uploaded the required proof documentation. The prospective employer will see that. After the pre-screening candidate has been interviewed he or she may be notified by the pre-screening system to grant access to the prospective employer if the prospective employer wants to hire. If the pre-screening candidate does not feel that the prospective employer is a good match, they can decline the requested access to the sensitive data. Feedback from the pre-screening candidate about the prospective employer/interview is useful to the pre-screening system and the prospective employers. The independent pre-screening system may also candidates were actually selected and scheduled for an interview. This may be accomplished by requiring that pre-screening candidates exclusively control when sensitive information is released to prospective employers. The pre-screening candidate may also request that all sensitive data be deleted if they decide not to share it with prospective employers. The workflow described above keeps sensitive data secure (in escrow) and allows the pre-screening system to monitor prospective employers, for compliance, fraud, and overall conduct.

Additionally, a pre-screener may be rated in a number of ways. For example, the following questions may be determined about the pre-screener. Did the pre-screener receive a positive or negative assessment by the employer/offer manager? Did the employer hire a candidate that was pre-screened by a pre-screener?

In some examples, 3 levels may be implemented in the pre-screening system. Each one of the levels below may have a corresponding notification. The levels may include: Level 1 including a Resume and Phone Pre-screening Interview Module, Level 2 including Employer elected Pre-screening modules, and Level 3 including employer scheduled interview. Additional levels corresponding to a pre-screening candidate may also be included.

Within Level 1, a plurality of status notifications may be provided. For example, an "Auto Saved" status notification may be included in level 1. This status notification may be displayed when the pre-screening candidate does not complete all parts of the offer registration. Those parts that are completed are auto saved. A "Bookmarked" status notification may be included in level 1. This status notification is displayed when the pre-screening candidate is interested in an offer, but wants to register at a later time in the future. A "Call Required" status notification may be included in level 1. This status notification may be displayed when the pre-screening candidate has not initiated the telephone interview after paying his/her fee for the pre-screening. A "Processing" status notification may be included in level 1. This status notification may tell the pre-screening candidate that their candidate portfolio is being processed or prepared for pre-screening. A "Pre-screening" status notification may be included in level 1. This status notification may tell the pre-screening candidate that the candidate's candidate portfolio is currently in the pre-screening pool or being pre-screened.

Level 2 may also include a plurality of status notifications. For example, an "Under Review" status notification may be included in level 2. This status notification may tell the pre-screening candidate that makes it to this stage that the potential employer is currently reviewing the candidate's portfolio. If the employer may not elect to assign additional assessment modules, then the candidate is either processed to be scheduled for an interview, placed on standby or hired. A "Pending Assessments" status notification may be included in Level 2. This status notification tells the pre-screening candidate that the employer has elected additional assessment modules that must be completed. This may depend on the GPA obtained by the candidate. Employers can designate what GPA is able to proceed to level 2. The employer may override the GPA cut-off during the "Employer Review" status notification.

Level 3 may also include a plurality if status notifications. For example, an "Interview Scheduled" status notification may be included in level 3. This status notification informs the candidate that the candidate has been selected to have an interview with the employer. An "On Standby" status notification also may be included in level 3. This status notification informs the candidate that the candidate has been placed on the employer's standby list and may be contacted in the future. A "Hired" status notification further may be included in level 3. This status notification informs the candidate that they have been hired out of all the candidates that have been interviewed. An "offer closed" status notification may be included in level 3. This status notification informs everyone that has participated in the offer that it has officially expired.

An "on hold" status notification may be included in level 3. This status notification informs all pre-screening candidates that the offer has been placed on hold by the employer. This technically freezes all submissions and reviews until further notice is provided. The hold duration typically cannot last longer than 30 days. If the employer cannot continue, the offer may show the offer expiration status. If employers do not honor their offers more than twice in a calendar year, they may be notified by the pre-screening system that their account may be restricted or suspended. A "withdraw" status notification may be included in level 3. This status notification informs the employer and the pre-screening system that the candidate has chosen to withdraw from an offer. A "withdraw" status notification may also be included in level 3. This status notification informs all pre-screening candidates that the employer has chosen to withdraw the offer. The same rules may apply as employer "on hold".

Additionally, level 1 status notifications may inform candidates that their pre-screening is completed, what was evaluated, what the candidate's total GPA is, if the candidate ranks in a top percentile range and any necessary job coaching. Candidates may receive a daily notification for as long as they remain in the top percentile range and/or until the offer expiration date. It is important not to disclose openly how many pre-screening candidates have responded and/or the grades and rankings of other pre-screening candidates. This ensures that the employer's recruitment policies and statistics are kept confidential. The type and scope of the job coaching is determined by the offer details and candidate's GPA. Each notification may remind the candidate of the offer cut-off date (same as offer expiration date).

Furthermore, level 2 status notifications may only be sent to candidates that have been selected for level 2 pre-screening modules. These candidates may receive a similar notification to that of level 1, but only level 2 candidates' scores may be factored into the top percentile. It is also important to note that level 1 candidate may graduate to level 2 based on their GPA. If their GPA is equal to or above a certain grade, they may be automatically elevated to level 2 for further pre-screening.

Level three candidates may be sent a notice that they have been selected to be interviewed by the employer. They may be prompted to upload any documents that are required to prove compliance with the offer requirements. Alternatively, they may be given the option to bring proof documents to their scheduled interview. Once a pre-screening candidate has been scheduled for an interview, they may no longer receive level one or two notifications.

Upon offer expiration, a notification letter may be sent to all candidates. Candidates that are hired may be evaluated after a probationary period, such as 30-90 days. The employer may select from a list of post-employment modules designed to evaluate the aptitude and performance of the newly hired.

Further in some example, the independent pre-screening system may provide proactive methods to publish postings in anticipation of seasonal hiring, attrition and or in the event of a spike or increase in production demands. The employer may decide what these trigger thresholds are to be. The pre-screening system may suggest the best channel and demographic to target based on historical pre-screening trends captured and analyzed. The pre-screening system can be configured to automatically publish postings in order to maintain hiring quotas.

In some examples, the independent pre-screening system may include a job posting manager. The offer manager may be configured to create a job posting. Progressive intelligence could show appropriate modules, candidates may go through the module and get a pass/fail, or a grade. Modules can also be set-up via an employer. Additionally, the employer may be given a status regarding the setup.

Publishing the job posting may require that modules be completed. Modules may be added or removed at any time after publishing, with usual disclaimers. Modules maybe built by the developers of the pre-screening system and/or by third-party developers. Pre-screening modules may be hosted by the pre-screening system for integrity, security, PCI compliance, etc. Pre-screening modules may be marketed and managed similar to that of an application store. A level one pre-screening module may be paid for by candidates. A level two pre-screening module may be ordered and paid for by employers.

The following are possible examples of level 2 modules: a psychological evaluation module, a logic and aptitude test module, a programming test module, quizzes that test domain knowledge, a word per minute typing module, etc. A credit report module may be generated on a reverse lookup of the pre-screening candidate's phone number. This would be beneficial for Tenant Screening. Modules may also be used to review the probation period of an employee some number of months into their employment. If the employee passes with a certain score, they may be allowed to stay on. Level 2 modules may enable the pre-screening system to call personal and professional references automatically. Another use of a level 2 module is to automate employment verification of a candidate. Modules may also be setup to utilize pre-screeners for evaluating pre-screening candidates.

Additionally, the independent pre-screening system may be configured to generate a pre-screening badge, which may be placed on any website. The badge enables a pre-screening candidate to prove that they have finished a task by achieving something or obtaining something at a third-party domain. Similar badges on the Internet are used in quiz and/or assessment websites which can be used to test a candidate's domain knowledge. Owners of such websites may prefer that pre-screening candidates utilize their online assessments directly, rather than spend the development resources required to build modules for use in the pre-screening system application store.

An offer manager may also be included in the independent pre-screening system. The offer manager may be configured to link to such a site, and when the assessment is completed, the site may instruct the candidate to click on a pre-screening badge, which, when clicked, opens up the prescreening system in a new window, as well as sending the assessment results into the prescreening system.

If the pre-screening candidate has already authenticated with the pre-screening system, and this authentication is being persisted via a secure cookie, the candidate may not be required to login again, and the results may be saved to their account.

Otherwise, the candidate may be prompted for the candidate's credentials and/or asked to create an account. As a security measure to prevent spoofing, fraud, etc., a custom image may be created by the prescreen candidate and the image may be displayed at the time of registration. If the prescreen candidate does not recognize the candidate's customized image, the candidate may not proceed. As a result fraud protection may be enhanced.

Pre-screening candidates may be eligible for a free telephone interview pass, if the pre-screening system fails to call due to an error within our system.

The independent pre-screening system may keep pre-screeners in one job posting per session. This prevents the pre-screeners from working on multiple job postings, reducing the likelihood of mistakes. The pre-screening system may also limit the number of candidate portfolios that can be pre-screened per duration of time, such as an hour. The pre-screening system may also meter the number of pre-screeners being contracted and if more need to be contracted it would happen automatically.

If the pre-screening candidate postpones the interview, the pre-screening system may prompt the pre-screening candidate to complete the telephone interview before the offer expires or the pre-screening candidate's resume may not be pre-screened until they complete the interview phase. The employer may have access but they may not choose to review it without an interview.

The employer may enter questions and answers or select from previously entered questions and their corresponding answers entered by other employers. By having a pool of job title specific questions and answers, it is much easier for the employer to conduct an effective interview.

The independent pre-screening system may use protection on the transmittal and storage of all data. All sensitive data is stored used a suitable encryption technique, such as Rijndael encryption with a 256 bit key. Specifically, connection strings may be encrypted. Passwords may also be used to increase security.

The following use case scenarios are provided to enhance the conceptual understanding of the independent pre-screening system but they are not intended to limit the independent pre-screening system in any way.

In a first use case scenario, the independent pre-screening system may be used in a micro-site for an attorney. For example, the independent pre-screening system may enable professionals (e.g., attorneys) to pre-screening offers at a micro-level (e.g., grade a contract, NDA, claim, patent idea, etc.,) using a specified rubric. A key workflow change would be that the attorney and/or firm's staff would do the pre-screening. The customer may then decide to retain the attorney or get another grade from another attorney, or move forward on their own. The attorney may name their price $10-$100 (for x minutes) to grade (fee for service) and also qualify the lead. The attorney would let the potential client know that they are willing and able to take on the work. The pre-screening system may charge a fee for its role. The pre-screening system also becomes an independent recorder (user/date/time stamp) of whatever is screened (copyrights). This may protect the party submitting. The pre-screening system would allow the attorney to market services across any social network with relative ease. It may be appreciated that this micro-site idea may be applied to other professionals (e.g., doctors, engineers, accountants, etc.)

For example, an email signature might look like this:
Steven A. Smith
(123) 123-1234
Email: steven.smith@examplemailhost.com
Offers: stevensmith.offercloud.com
Website: www.examplewebsite.com Another use case scenario involving the independent pre-screening system includes a customer support scenario in which the system is used to provide customer support to companies. For example, companies may route customers to the pre-screening system first. The pre-screening system may first evaluate what support level should be provided. After presenting the support case through one of the following methods (drill down questionnaire, telephone interview, upload screenshots, confirm error codes, etc.). The pre-screening system may determine if there is a quick answer or workaround, if not the customer and all information collected concerning the case may be made available to a tier 2 or higher support person employed or outsourced by the distributor/manufacturer. The pre-screening system could network support from pre-screeners anywhere in the world. The customer may have one central tool for all open and pending support cases across any vendor. The pre-screening support fee could be paid by the customer or by the seller. The MVP (most valuable pre-screener) could be additionally compensated by the seller based on their performance and ranking. The pre-screening system may essentially become tier one of the support process. Companies would only pay a reporting fee (for quality assurance purposes) and a storage/access fee so that they can directly access case information. This would significantly drive down support expenditures while still maintaining quality customer service.

In another use case scenario, the independent pre-screening system may help find candidates for various clinical trial studies. For example, the sponsor (the entity that makes the drug, as distinguished from a contract research organization (CRO) which runs the study for the sponsor) of the clinical trial could create a clinical trials offer for acne. The doctor, staff and clinic implement the study and they are monitored by CRO. The sponsor may establish the criteria for the study in the offer requirement checklist (also known as the Inclusion/Exclusion Criteria). If a pre-screening candidate can satisfy all the requirements, the candidate is allowed to progress to the next step. In a next step a medical history form may be created. The third step may be the automated telephone interview. In this step the candidate may be asked questions that are pertinent to the study and that would ascertain reasons the candidate is interested in the study. It is especially helpful to know if they are mainly doing it for monetary purposes. If candidate complies, then proof or further information may be required. Some information may need to be collected at the time of the scheduled interview. However, other information may be uploaded through the pre-screening system prior to approving and establishing a scheduled interview. This may include proof of one's age, pictures, or anything that might affect their acceptance and/or participation in a study.

The pre-screening system also may be responsible for tracking referral origin/channel from where the candidate responded (Internet, Print, Radio, and TV). It may be desirable to document the psychographic and demographic variables used to promote and target study recipients. Background checks may also be part of the workflow. Sometimes the sponsor may ask for medical records. It may also be asked that the candidate undergo drug testing before participating in the study. The pre-screening system would use level 2 to fulfill these additional checks. A key difference from job pre-screening is that the clinical trials candidate is not required to pay. In a clinical trials study, the candidate is never required to pay. In this embodiment, the pre-screening system may utilize the voucher. If the candidate shows that they are the ideal patient for the trial, the pre-screening cost is paid for by the sponsor or doctor, depending on the contractual relationship. The doctor may setup an appointment to affirm that all the data collected is true and correct (level 3). At this time the candidate may be required to sign a consent form to formalize their participation in the study. It will be appreciated that the above clinical trial example is but one illustrated medical scenario in which the system may be utilized. Various other medical applications are also envisioned, such as telemedicine workflows.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A pre-screening system, comprising:
a pre-screening workflow manager executed on one or more servers comprising memory executable via a processor to:
execute an automated pre-screener simulator module to grade a plurality of a pre-screeners;
approve or deny each of the plurality of pre-screeners based on a respective grade determined via the pre-screener simulator module;
receive a pre-screening candidate portfolio;
execute an automated pre-screening interview in response to receiving the pre-screening candidate portfolio; and
if the automated pre-screening interview has been completed, send the corresponding pre-screening candidate portfolio including a pre-screening interview file to a candidate queue stored in a prescreening database, the candidate queue storing a plurality of pre-screening candidate portfolios; and
a pre-screening candidate manager executed on the one or more servers including memory executable by a processor to:
request and receive the pre-screening candidate portfolio from the candidate queue;
send a portion of the pre-screening candidate portfolio including the pre-screening interview file and at least one pre-screening rubric to a remotely executed pre-screening program, the pre-screening rubric providing a grading criteria to a pre-screener to enable pre-screeners to grade the pre-screening interview file; and
receive a portfolio evaluation from the pre-screening program, the evaluation assessing the pre-screening candidate portfolio.

2. The pre-screening system of claim 1, where the pre-screening candidate portfolio is associated with a job posting and the candidate manager is further configured to send a candidate package to a business entity related to the job posting when a predetermined monetary value has been received via the pre-screening candidate manager, the candidate package including a ranked candidate list and a plurality of candidate portfolios.

3. The pre-screening system of claim 1, where the automated pre-screening interview is executed if the pre-screening candidate portfolio passes a predetermined set of fulfillment criteria, the fulfillment criteria including at least one of a payment criterion and a fulfillment criterion including one or more of an offer requirement, resume, automated interview, and/or candidate fee, and a graded evaluation of the pre-screening candidate portfolio is made in part based on how many of the predetermined set of fulfillment criteria are fulfilled and the quality and nature of the manner in which they are fulfilled.

4. The pre-screening system of claim 1, where the pre-screening candidate manager is configured to rank the portfolio evaluation in a candidate status chart corresponding to a job posting and where the pre-screening workflow manager is configured to associate the pre-screening candidate portfolio with the ranked portfolio evaluation.

5. The pre-screening system of claim 1, where the pre-screening rubric is configured to provide grading criteria to a user of the pre-screening program via a GUI.

6. The pre-screening system of claim 1, where the portfolio evaluation is configured to receive pre-screener input via a computing device.

7. The pre-screening system of claim 1, where the pre-screening rubric includes an interview rubric section configured to present scoring guidelines for the pre-screening interview on a GUI and a resume rubric section configured to present scoring guidelines for a candidate's resume included in the pre-screening candidate portfolio on the GUI.

8. The pre-screening system of claim 1, where the portion of the candidate portfolio sent to the remotely executed pre-screening program does not include any personally identifiable information of the candidate, the personally identifiable information being maintained internally in the pre-screening candidate manager via storage of the personally identifiable information in the memory of the pre-screening candidate manager.

9. The pre-screening system of claim 8, where the personally identifiable information that is maintained internally in the pre-screening candidate manager includes at least one of a name, an address, a telephone number, a social security number, and a pre-screening receipt for verification.

10. The pre-screening system of claim 1, where the pre-screening workflow manager is configured to provide predetermined audio clips or text clips to a pre-screening candidate's communication device and collects responses to the audio clips for a predetermined time period during execution of the automated pre-screening interview.

11. The pre-screening system of claim 10, where the pre-screening candidate portfolio is associated with a job posting and the predetermined audio or text clips are predetermined questions and/or answers determined by an employer related to the job posting.

12. The pre-screening system of claim 1, where the pre-screening workflow manager is configured to persistently track the pre-screening candidate portfolio for updates subsequent to execution of the automated pre-screening interview.

13. The pre-screening system of claim 12, where the pre-screening workflow manager is configured to send an update message to a candidate's computing device corresponding to the pre-screening candidate portfolio when the pre-screening candidate portfolio has been updated.

14. The pre-screening system of claim 1, wherein the automated pre-screening interview is executed in response to receiving an interview invitation from an employer computing device.

15. The pre-screening system of claim 1, wherein the pre-screening candidate portfolio is not associated with a job posting.

16. A method for pre-screening a plurality of job candidates stored in memory executed by a processor in an independent pre-screening system, the method comprising:
    executing an automated pre-screener simulator module to grade a plurality of pre-screeners;
    approving or denying each of the plurality of pre-screeners based on a respective grade determined via the pre-screener simulator module;
    receiving a pre-screening candidate portfolio;
    if the candidate portfolio passes a predetermined set of fulfillment criteria, executing an automated pre-screening interview;
    if the automated pre-screening interview is completed, sending the corresponding pre-screening candidate portfolio including a pre-screening interview file to a candidate queue in a pre-screening database;
    requesting and sending a portion of the candidate portfolio including the pre-screening interview file and a pre-screening rubric from the candidate queue to a remotely executed pre-screening program, the pre-screening rubric providing a grading criteria to a pre-screener to enable pre-screeners to grade the pre-screening interview file;
    receiving a portfolio evaluation from the remotely executed pre-screening program; and
    ranking the portfolio evaluation in a candidate status chart for the job posting.

17. The method of claim 16, further comprising sending an offer packet to an employer computing device associated with the job posting when a predetermined monetary value has been received via the independent pre-screening system, the offer packet including a list of ranked candidates and a plurality of associated portfolios.

18. The method of claim 17, where the pre-screening rubric is configured to be presented on a GUI and includes a resume rubric section for scoring a resume and an interview rubric section for scoring the automated pre-screening interview.

19. The method of claim 16, where executing the automated pre-screening interview includes:
    providing a plurality of predetermined questions to the candidate; and
    receiving responses to the questions for a predetermined time period.

20. The method of claim 16, where the predetermined questions are provided by an employer associated with the job posting.

21. The method of claim 16, wherein the automated pre-screening interview must be finished within a pre-determined period of time to be completed.

22. The method of claim 16, where the automated pre-screening interview is executed if a payment has been received by the prescreening system from at least one of a candidate, an employer, and a third party.

23. An independent pre-screening system comprising:
    a pre-screening workflow manager executed on one or more servers comprising memory executable via a processor to:
        execute an automated pre-screener simulator module to grade a plurality of pre-screeners;
        approve or deny each of the plurality of pre-screeners based on a respective grade determined via the pre-screener simulator module;
        receive a pre-screening candidate portfolio for an associated job posting;
        if the pre-screening candidate portfolio passes a predetermined set of fulfillment criteria, execute an automated pre-screening interview; and
        if the automated pre-screening interview has been completed, send the corresponding pre-screening candidate portfolio including a pre-screening interview file to a candidate queue stored in a prescreening database, the candidate queue storing a plurality of pre-screening candidate portfolios; and
    a candidate manager executed on the one or more servers including memory executable by a processor to:
        request and receive the pre-screening candidate portfolios from the candidate queue;
        send a portion of the pre-screening candidate portfolios including at least one pre-screening interview file and at least one pre-screening rubric to a remotely executed pre-screening program, the at least one pre-screening rubric providing a grading criteria to a pre-screener to enable pre-screeners to grade the pre-screening interview file;
        receive a portfolio evaluation from the pre-screening program, the evaluation assessing the pre-screening candidate portfolio; and
        send a candidate package to a business entity associated with the job posting when a predetermined monetary value has been received via the candidate manager, the candidate package including a plurality of ranked candidate portfolios.

24. The independent pre-screening system of claim 23, where the pre-screening workflow manager is configured to provide predetermined audio clips to a pre-screening candidate's communication device and collects responses to the audio clips for a predetermined time period during execution of the automated pre-screening interview.

* * * * *